(12) United States Patent
Weston

(10) Patent No.: US 8,477,242 B2
(45) Date of Patent: Jul. 2, 2013

(54) DIGITAL IMAGE PROCESSING FOR CONVERTING IMAGES FROM ONE SAMPLING STRUCTURE TO ANOTHER

(75) Inventor: Martin Weston, Petersfield (GB)

(73) Assignee: Snell Limited, Reading (GB)

( * ) Notice: Subject to any disclaimer, the term of this patent is extended or adjusted under 35 U.S.C. 154(b) by 133 days.

(21) Appl. No.: 12/992,192

(22) PCT Filed: May 15, 2009

(86) PCT No.: PCT/GB2009/050530
§ 371 (c)(1),
(2), (4) Date: Feb. 7, 2011

(87) PCT Pub. No.: WO2009/138804
PCT Pub. Date: Nov. 19, 2009

(65) Prior Publication Data
US 2011/0128441 A1    Jun. 2, 2011

(30) Foreign Application Priority Data

May 15, 2008 (GB) .................................. 0808849.4

(51) Int. Cl.
*H04N 5/91* (2006.01)
*H04N 7/12* (2006.01)

(52) U.S. Cl.
USPC .................................. 348/441; 375/240.21

(58) Field of Classification Search
USPC ................ 348/441, 443, 445, 449, 458, 459; 375/240.21, 240.16, 240.25, 240.29
See application file for complete search history.

(56) References Cited

U.S. PATENT DOCUMENTS

| 5,576,837 | A  | * | 11/1996 | Strolle et al. ............... 386/312 |
| 5,671,298 | A  | * | 9/1997  | Markandey et al. ......... 382/298 |
| 5,802,218 | A  | * | 9/1998  | Brailean ..................... 382/275 |
| 5,986,715 | A  | * | 11/1999 | Ikeyama et al. ............. 348/441 |
| 5,991,456 | A  | * | 11/1999 | Rahman et al. ............. 382/254 |
| 6,249,549 | B1 | * | 6/2001  | Kim ......................... 375/240.21 |
| 6,437,827 | B1 | * | 8/2002  | Baudouin .................... 348/453 |
| 6,570,922 | B1 | * | 5/2003  | Wang et al. .............. 375/240.12 |
| 6,760,379 | B1 | * | 7/2004  | Werner ................... 375/240.21 |
| 2004/0090554 | A1 |  | 5/2004 | Nishi |
| 2007/0280069 | A1 | * | 12/2007 | Cheng et al. .............. 369/47.25 |

FOREIGN PATENT DOCUMENTS

| JP | 9162699 | 6/1997 |
| JP | 2002300007 | 10/2002 |

OTHER PUBLICATIONS

PCT/GB2009/050530, International Search Report and Written Opinion, Jan. 28, 2011, (7 pages).
Office Action from the Japanese Patent Office for Application No. 2011509023 dated Jul. 17, 2012 (English Translation Only, 3 pages).

* cited by examiner

*Primary Examiner* — Paulos M Natnael
(74) *Attorney, Agent, or Firm* — Michael Best & Friedrich LLP

(57) ABSTRACT

First image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter where the combination of the up-sampling filter and the down-sampling filter is substantially transparent and every filtered sample is formed from a weighted sum of at least two input samples.

18 Claims, 19 Drawing Sheets

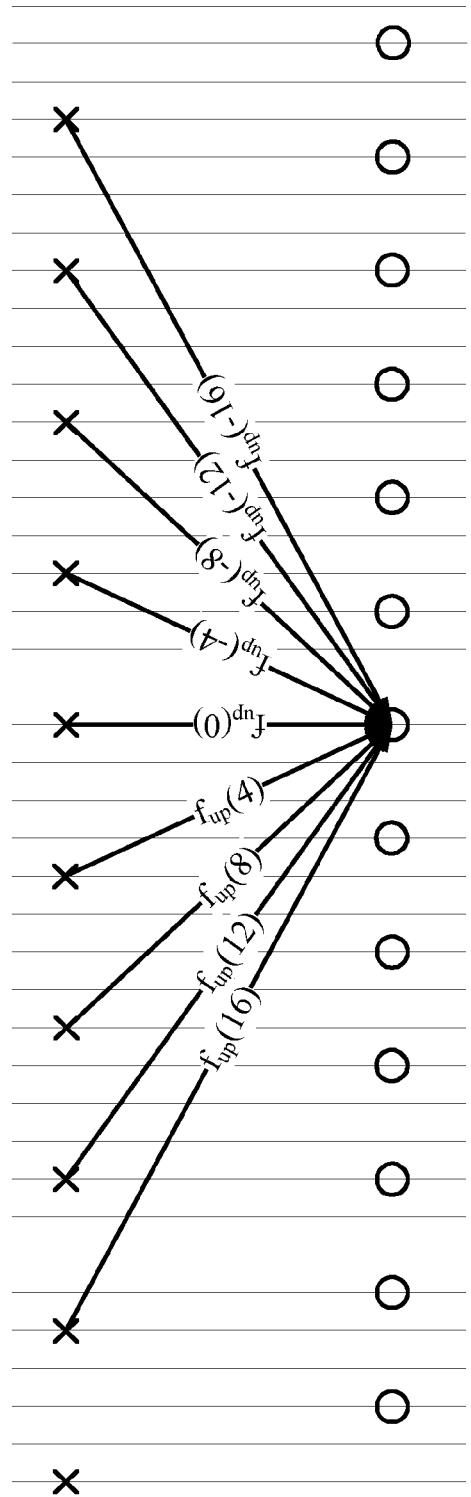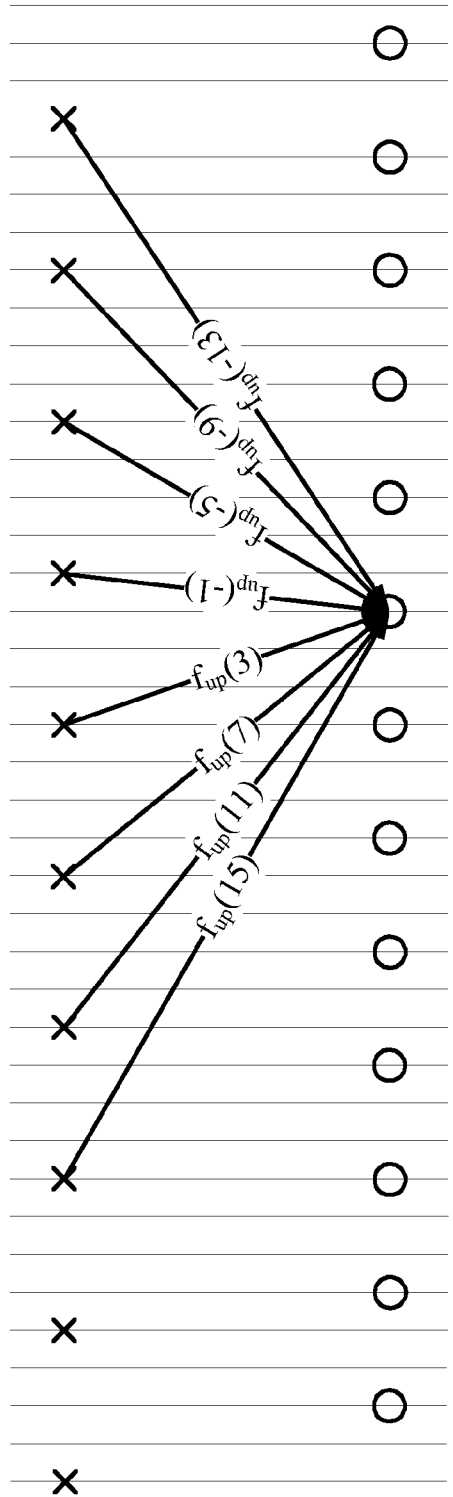

DIGITAL IMAGE PROCESSING FOR CONVERTING IMAGES FROM ONE SAMPLING STRUCTURE TO ANOTHER

CROSS-REFERENCE TO RELATED APPLICATIONS

This patent application is a national stage filing under 35 U.S.C. 371 of International Application No. PCT/GB2009/050530, filed May 15, 2009, which claims foreign priority to Great Britain Patent Application No. 0808849.4, filed May 15, 2008, the disclosures of which are incorporated by reference herein in their entireties. Priority to each application is hereby claimed.

FIELD OF INVENTION

This invention concerns re-sampling of images.

BACKGROUND OF THE INVENTION

The increasing diversity of image display formats has resulted in considerable interest in converting images from one sampling structure to another. In particular the increased use of "high-definition" (HD) television formats (i.e. formats where the vertical spatial sampling frequency is of the order of 1,000 samples per picture height) has led to the development of production equipment which can operate on both HD and standard definition (SD) formats. In some equipment, processing is carried out at one particular high-resolution sampling structure, and inputs can be received, and outputs can be delivered, either with the structure used for processing, or at a different sampling structure.

In such equipment images may need to be converted to a higher or lower rate before or after processing. It is now common for two, complementary conversions to be needed: one from the input sampling structure to the processing structure; and another, from the processing structure back to the original input structure. It is highly desirable for these conversions to be transparent to the user, and, provided the processing structure has higher sampling frequencies in all dimensions, the cascaded up- and down-sampling can be made mathematically transparent.

Typically, input sample values from adjacent sample locations are combined as a weighted sum in a filter aperture so as to derive new sample values at locations other than the input sample locations. The filter may have several "phases" so that different weightings are used to obtain new values for sample sites having different spatial relationships to the input sample locations. Often the filter is one-dimensional so that the filter aperture comprises a set of horizontally contiguous samples or a set of vertically contiguous samples. However, two, and three-dimensional filters are also known, in which the filter aperture comprises a set of samples in a two-dimensional image region, or a set of two dimensional regions from images sampled at different times.

In multi-standard video processing systems it is desirable that complementary up- and down-conversion filters should be available with similar levels of complexity—i.e. aperture size and coefficient magnitudes. Symmetrical filters are easier to implement. Both types of filter should have high stop-band attenuation, so as to reduce aliasing; and, these features should be combined with the property of reversibility. Such filters are required for conversion between the commonly-used horizontal sample structures of 720, 960 and 1280 samples per line; and vertical sampling structure of 480, 486, 576, 720 and 1080 lines per picture. In these conversions the relative phasing of the input and output sampling grid may be required to be offset so as to avoid a shift in the position of the image centre when converting.

U.S. Pat. No. 6,760,379 (Werner)—which is hereby incorporated by reference—describes how, given a linear up-conversion filter, a complementary down-conversion filter can be derived, so that the cascading of the two complementary processes is mathematically transparent. It is helpful to review the example filters shown in this prior patent so as to clarify the improvements provided by the current invention.

FIG. 1 illustrates up-conversion by a factor of 3:4 followed by down-conversion by 4:3 according to a mutually reversible pair of filters. The set of low-resolution samples $L_0$ to $L_4$ is up-converted to the (more-numerous) set of high-resolution samples $H_0$ to $H_5$, which are then down-converted to the low-resolution samples $L'_0$ to $L'_4$. The up-conversion filter is a bilinear interpolator and the down-conversion filter is the filter 'undo-bil' described in the Werner patent.

In FIG. 1 the filter coefficients are shown by arrows. Following the notation of Werner, up-conversion filter coefficients are denoted by $g(x)$ and down-conversion filter coefficients are denoted by $h(x)$, where x is the phase offset between the input and output samples expressed in units of the pitch of an intermediate sampling grid which includes both sets of samples. In the Figure each down-conversion filter coefficient is only shown once, but up-conversion filter coefficients are shown for all samples which contribute to any samples contributing to the shown down-conversion coefficients.

The coefficients of the FIG. 1 filters are shown in FIG. 2 in the form of filter aperture functions. The filter aperture (20) corresponds to the bilinear up-conversion filter $g(x)$, and the filter aperture (21) corresponds to the filter $h(x)$, which is the filter 'undo-bil' described in the Werner patent.

As can be seen from FIGS. 1 and 2, the down-conversion filter 'undo-bil' is asymmetric. The prior patent describes how such an asymmetric filter can be converted to a symmetric filter by averaging the filter aperture function with a mirror-image-reversed version of the aperture function, without losing the property of reversibility. FIG. 3 shows the same up- and down-conversion process as FIG. 1, but using a symmetric down-conversion filter derived from the filter 'undo-bil'. (Note that in FIG. 3 zero filter coefficients are not shown.) The corresponding down-conversion filter aperture is the function (41) shown in FIG. 4.

It can be verified from the coefficient values shown in FIG. 3 that the set of down-converted samples $L'_o$ to $L'_2$ are identical to the original samples $L_o$ to $L_2$, i.e. the up-conversion has been reversed transparently:

$$L'_0 = 1 \times H_0 = 1 \times L_0$$

$$L'_1 = [-1/6 \times H_0] + [2/3 \times H_1] + [1 \times H_2] - [2/3 \times H_3] + [1/6 \times H_4]$$

$$= -1/6 \times L_0 + 2/3 \times (1/4 \times L_0 + 3/4 \times L_1)$$

$$1 \times (1/2 \times L_1 + 1/2 \times L_2) -$$

$$2/3 \times (3/4 \times L_2 + 1/4 \times L_3) + 1/6 \times (L_3)$$

$$= [-1/6 \times L_0 + 1/6 \times L_0] +$$

$$[1/2 \times L_1 + 1/2 \times L_1] +$$

$$[1/2 \times L_2 - 1/2 \times L_2] +$$

$$[-1/6 \times L_3 + 1/6 \times L_3]$$

$$= L_1$$

Similarly, the contributions to L'$_2$ are a mirror image of the contributions to L'$_1$, and so L'$_2$ is equal to L$_2$.

And, all other down-converted samples are derived by contributions analogous to those used to derive L'$_0$, L'$_1$ and L'$_2$.

The Werner patent describes a second pair of complementary up- and down conversion filters, referred to as 'def' and 'undo-def', where the up-conversion has an improved frequency response, as compared to bilinear up-conversion. The aperture functions of these prior art filters are shown in FIG. 5, in which the up-conversion aperture is designated (50), and the down-conversion aperture is designated (51).

Note that the Figure only shows the central portion of the down-conversion filter aperture (51) which contains the largest coefficients; the full aperture extends over x values in the range −8 to +20. The coefficients of the full aperture are given in Table 4, which also includes all the down-conversion apertures described in this specification. (Table 3 lists the coefficients of all the up-conversion apertures described in this specification.) The down-conversion filter aperture (51) can be made symmetrical by the same method as described above, and the resulting filter aperture is shown as the aperture (61) in FIG. 6. Again, only the central portion of the aperture is shown in the figure, the full aperture extends from −20 to +20. It can be seen that the complementary down-conversion filter apertures (51) and (61) are much wider than the corresponding up-conversion filter aperture (50) (also shown as (60)).

It is helpful to examine the frequency responses of these prior-art filters, and they are shown in FIGS. 7 to 10. The responses have been calculated by converting the relevant filter apertures, which, of course, are the respective filter impulse responses, from the time domain to the frequency domain in the well-known manner.

The frequency scales of FIGS. 7 to 10 are in units of 12 times the frequency of the notional sampling grid that contains both the lower and higher sampling frequencies; i.e. the lower sampling frequency ($f_{low}$) corresponds to three units, and the higher sampling frequency ($f_{high}$) corresponds to four units. The Figures show the magnitudes of the responses; however, for the symmetrical filters, for which the response is always real (i.e. its imaginary component is zero), phase-inverted responses are shown as having negative amplitude.

FIG. 7 shows the response (71) of the 'undo-bil' down-conversion filter of the Werner patent; and, the response (70) of a bilinear up-conversion filter.

FIG. 8 shows the response (81) of a symmetric filter derived from the 'undo-bil' down-conversion filter by the method described in the Werner patent; and, the response (80) of a bilinear up-conversion filter (identical to the response (70)).

FIG. 9 shows the response (91) of the 'undo-def' down-conversion filter of the Werner patent; and, the response (90) of the 'def' up-conversion filter also described in the Werner patent.

FIG. 10 shows the response (101) of a symmetric filter derived from the 'undo-def' down-conversion filter by the method described in the Werner patent; and, the response (100) of the 'def' up-conversion filter (identical to the response (90)).

It can be seen that the frequency responses of these prior art down-conversion filters are less than optimum. They all have poor stop-band attenuation (above 1.5 frequency units); in particular there is significant response at the lower sampling frequency $f_{low}$ (3 frequency units). Any signal energy at this frequency would be aliased to DC. This alias is likely to prove particularly troublesome when down-converting material which has not been previously up-converted. It can also be seen that none of the filter pass-bands are particularly flat.

The up- and down-conversion filters shown in FIGS. 1 to 6 are what the Werner patent describes as "Nyquist" filters for which a regular sub-set of the output samples are equal to input samples. The samples in this sub-set are formed by copying the values of respective, spatially-aligned filter input samples. For example, in FIG. 1 the up-conversion filter g(x) and the down-conversion filter h(x) both give outputs copied from their respective inputs when the input to output phase offset x is zero.

SUMMARY OF THE INVENTION

The invention consists in one aspect in a method and apparatus for digital image processing in which first image data at a lower sampling frequency is up-sampled to a higher sampling frequency in an up-sampling filter; and, second image data at the said higher sampling frequency is down-sampled to the said lower sampling frequency in a down-sampling filter where the combination of the up-sampling filter and the down-sampling filter is substantially transparent, characterised in that every filtered sample is formed from a weighted sum of at least two input samples.

Suitably, at least part the said first and second image data represent the same portrayed object.

Advantageously the amplitude of the response of the said up-conversion filter and the amplitude of the response said down-conversion filter have substantially equal magnitudes at a frequency of half the said lower sampling frequency.

In a preferred embodiment the frequency response of the said up-conversion filter and the frequency response said down-conversion filter are substantially identical.

And, the reconstruction error due to the combination of the up-sampling filter and the down-sampling filter is smaller than one least-significant bit of the said digital image processing.

The invention consists in another aspect in a method of digital image processing in which first image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter where the combination of the up-sampling filter and the down-sampling filter is substantially transparent characterised in that every filtered sample is formed from a weighted sum of at least two input samples, where N and M are integers, where 1<N<M and where M is not a multiple of N.

Preferably, which the combination of the up-sampling filter and the down-sampling filter is substantially transparent in the sense that the reconstruction error due to the combination of the up-sampling filter and the down-sampling filter is smaller than one least-significant bit of the said digital image processing.

The invention consists in another aspect in a method of digital image processing for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k) \cdot g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k) \cdot h(Mn-Nk)$; the pair (g, h) of up and down conversion filters being chosen so that $\Sigma h(Mn-Nk) \cdot g(Nk-Mm)$ is equal to unity if n=m and is otherwise equal to zero, and wherein every filtered sample is formed from a weighted sum of at least two input samples.

The invention consists in another aspect in a method of digital image processing for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k) \cdot g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k) \cdot h(Mn-Nk)$; the pair (g, h) of up and down conversion filters being chosen so that $\Sigma h(Mn-Nk) \cdot g(Nk-Mm)$ is equal to unity if n=m and is otherwise equal to zero, and wherein the frequency response of the up conversion filter is substantially the same as the frequency response of the down conversion filter.

The invention consists in another aspect in a method of digital image processing for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k) \cdot g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k) \cdot h(Mn-Nk)$; the pair (g, h) of up and down conversion filters being chosen so that $\Sigma h(Mn-Nk) \cdot g(Nk-Mm)$ is equal to unity if n=m and is otherwise equal to zero, and wherein the frequency response of the down converter at the sampling frequency of the sampled signal $S_{input}$ is less than 10%, preferably less than 5% and more preferably less than 1% of the frequency response at DC.

The invention consists in another aspect in method of digital image processing in which first image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter where the combination of the up-sampling filter and the down-sampling filter, where N and M are integers, where 1<N<M and where M is not a multiple of N, wherein a frequency response is optimised to minimise the reconstruction error due to the combination of the up-sampling filter and the down-sampling filter and wherein the filter aperture of the up-sampling filter and the filter aperture of the down-sampling filter are each constructed from said optimised frequency response.

Preferably, in said optimised frequency response the response at the lower sampling frequency is less than 10%, preferably less than 5% and more preferably less than 1% of the frequency response at DC.

Suitably, the reconstruction error is minimised in the sense of being smaller than one least-significant bit of the said digital image processing.

The invention consists in another aspect in a method of digital image processing in which first image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter where the combination of the up-sampling filter and the down-sampling filter is substantially transparent characterised, where N and M are integers, where 1<N<M and where M is not a multiple of N and wherein the frequency response of the down converter at the lower sampling frequency is less than 10%, preferably less than 5% and more preferably less than 1% of the frequency response at DC.

BRIEF DESCRIPTION OF THE DRAWINGS

FIGS. 20a to 20d show representations of the phases of an up-conversion process according to an embodiment of the invention.

DETAILED DESCRIPTION OF THE INVENTION

The Werner patent states that, when it is required to design a transparent up- and down-conversion process in which the down-conversion filter response reverses a given up-conversion filter response, the coefficients of the up-conversion filter g(x) and the coefficients of the down-conversion filter h(x) cannot be chosen independently. The prior patent goes on to say that, for given coefficients of g(x), the mathematical definition of reversibility leads to a system of linear equations for the coefficients of h(x).

The present inventor has appreciated that this equation system represents an under-defined problem (i.e. there are more equations than there are unknowns) and thus the designer has a choice of many possible down-conversion filters. As explained above, the prior-art filter aperture (41), shown in FIGS. 3 and 4, reverses a bilinear up-conversion filter (as shown (40) in FIG. 4). However, other down-conversion filters exists that transparently reverse that up-conversion; for example the aperture (111) shown in FIG. 11. The filter contributions for this alternative conversion are shown in FIG. 12. It can be seen that this alternative aperture is simpler to implement because it has fewer coefficients. The FIG. 3 down-conversion filter requires the storage of five coefficient values (excluding the unity centre coefficient, there are five non-zero contributions in each symmetrical half aperture), whereas the FIG. 12 down-conversion filter only needs two non-unity values to be stored.

Figure 12:
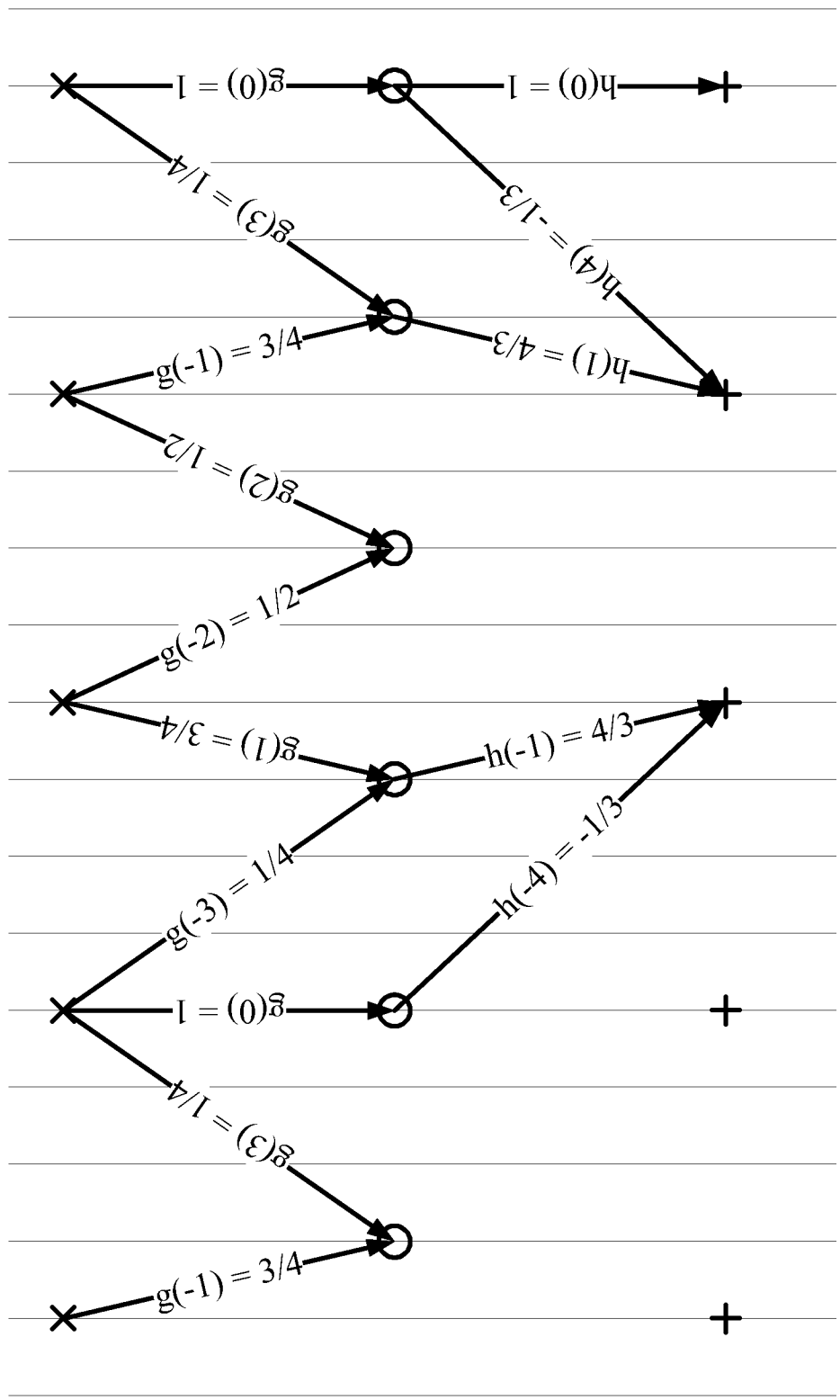
FIG. 12 shows a representation of the up- and down-conversion process using the filters of FIG. 11.
Figure 13:
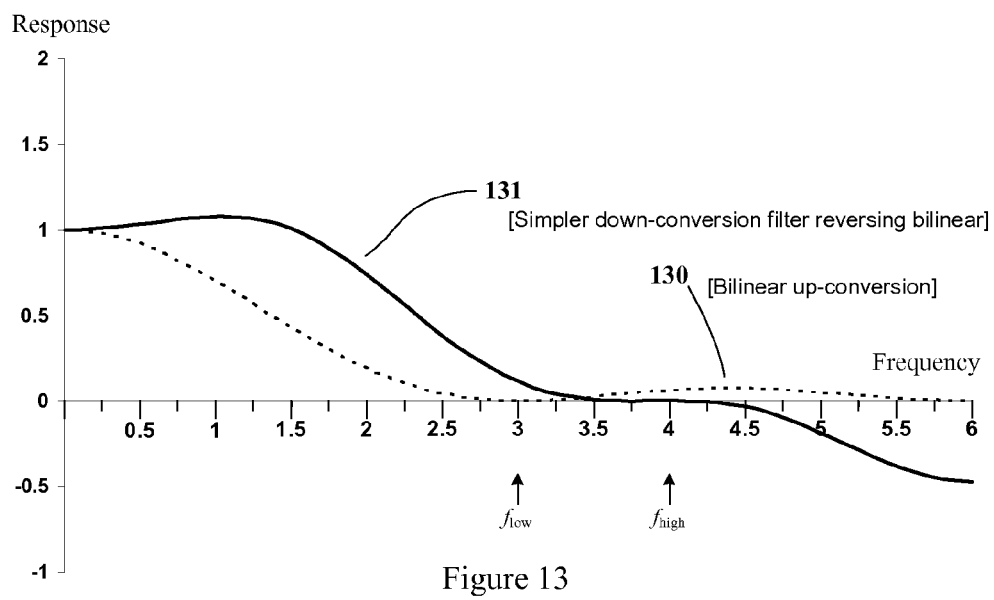
FIG. 13 shows the frequency responses of the FIG. 11 filter aperture functions.

The frequency responses of the FIG. 12 filters are shown in FIG. 13, in which the down-conversion filter response is designated (131), and the bilinear up-conversion filter response is designated (130). Comparison with FIG. 8, which shows the frequency responses of the FIG. 3 process, shows that both the pass-band and the stop-band of the alternative down-conversion filter (131) is flatter.

Figure 4:
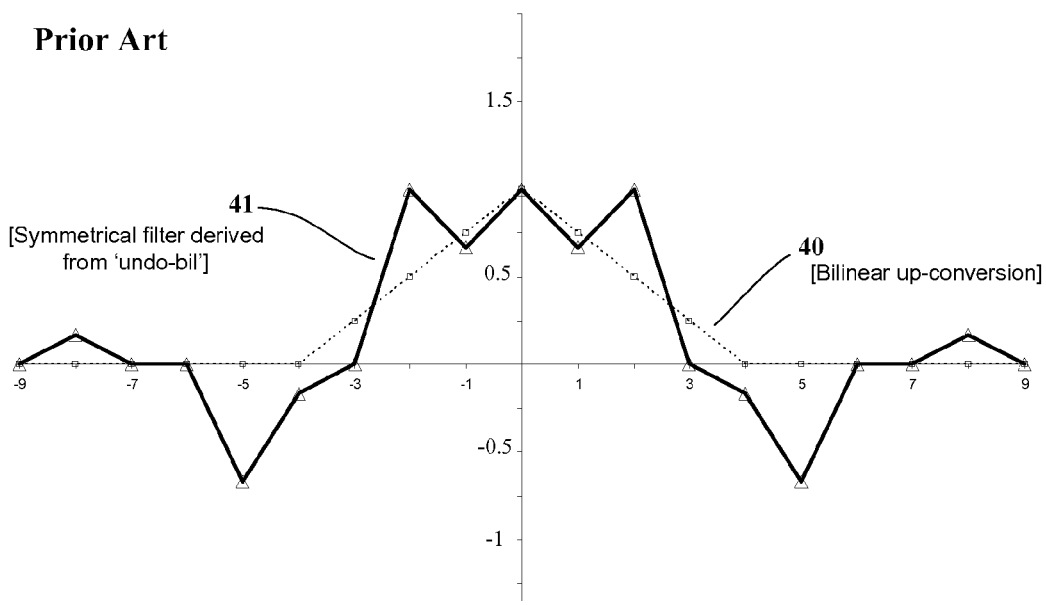
FIG. 4 shows the filter aperture functions of the prior art process of FIG. 3.
Figure 11:
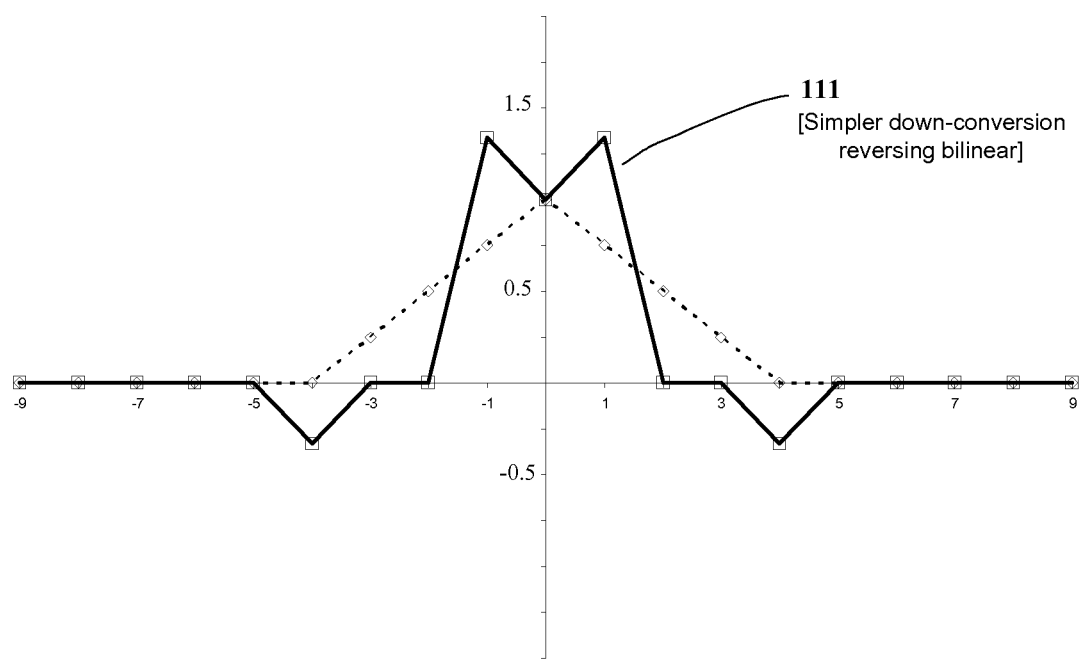
FIG. 11 shows the filter aperture functions of a transparent up- and down-conversion using an improved down-conversion filter.
Figure 14:
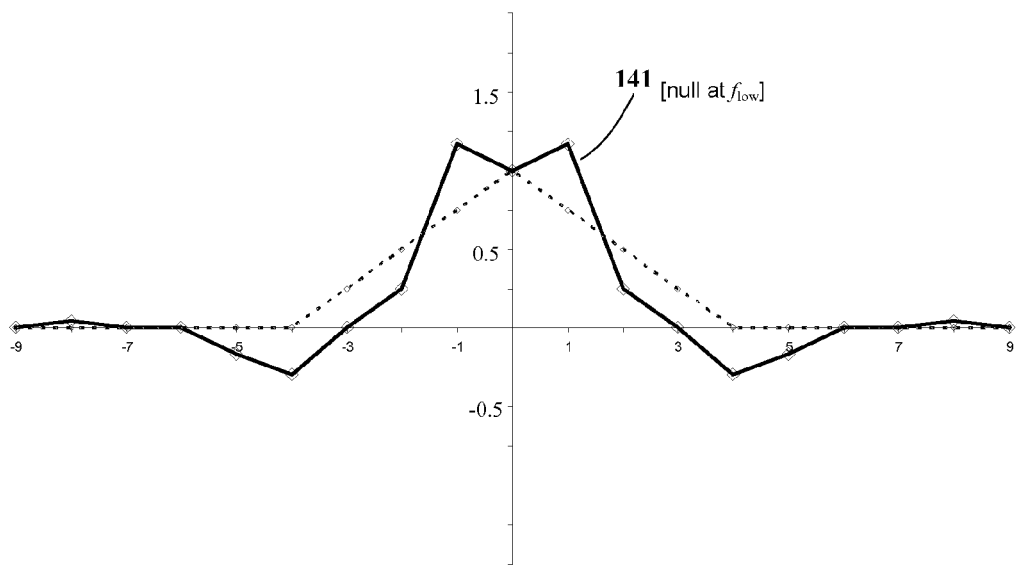
FIG. 14 shows the filter aperture functions of a transparent up- and down-conversion process using an improved down-conversion filter having null response at three frequency units.
Figure 15:
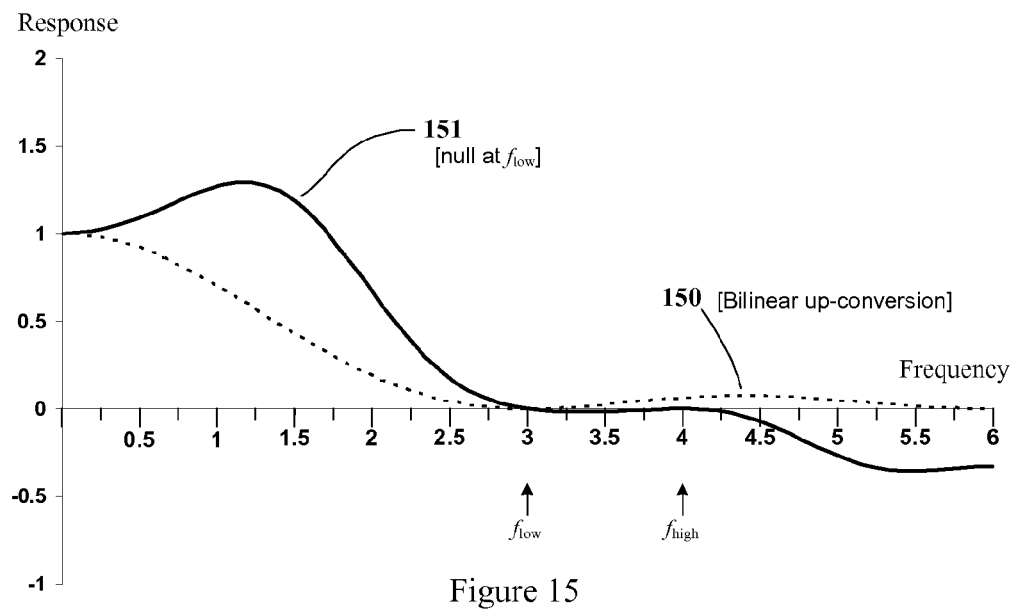
FIG. 15 shows the frequency responses of the FIG. 14 filter aperture functions.

A further improved down-conversion filter can be obtained by summing the aperture of FIG. 4 and the aperture of FIG. 11 with weighting factors of ¼ and ¾ respectively. This gives an aperture (141) as shown in FIG. 14, and its frequency response (151) is shown in FIG. 15. This improved filter has zero response at $f_{low}$ and therefore will suppress the DC alias due to any energy at this frequency.

Figure 6:
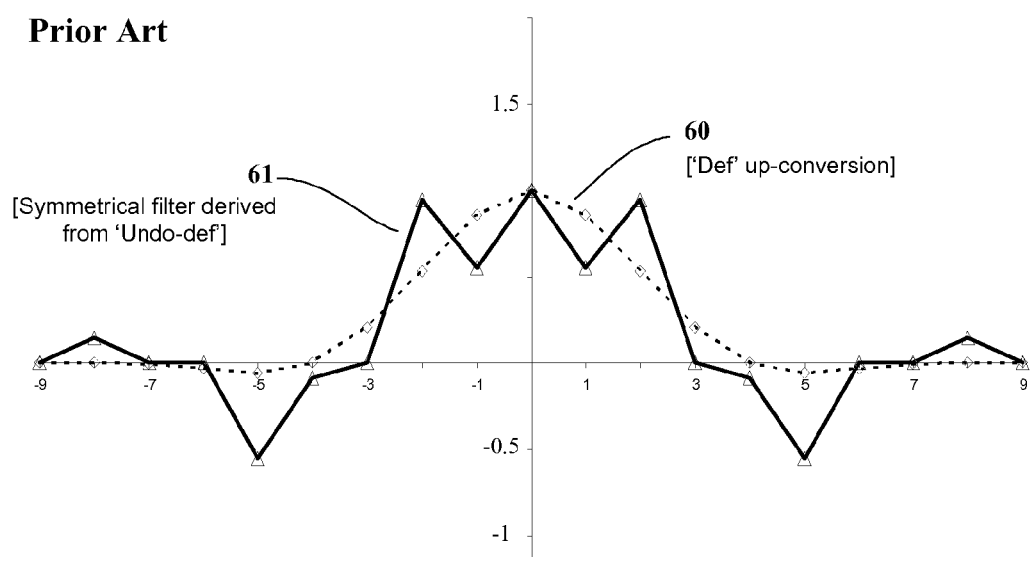
FIG. 6 shows the filter aperture functions of an alternative prior-art transparent up- and down-conversion using a symmetrical down-conversion filter.
Figure 10:
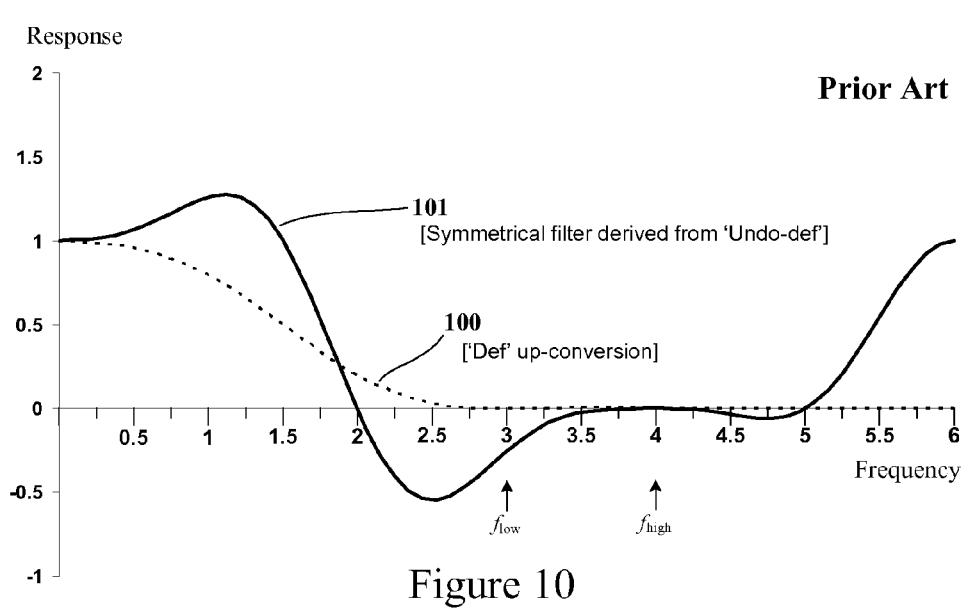
FIG. 10 shows the frequency responses of the FIG. 6 filter aperture functions.
Figure 16:
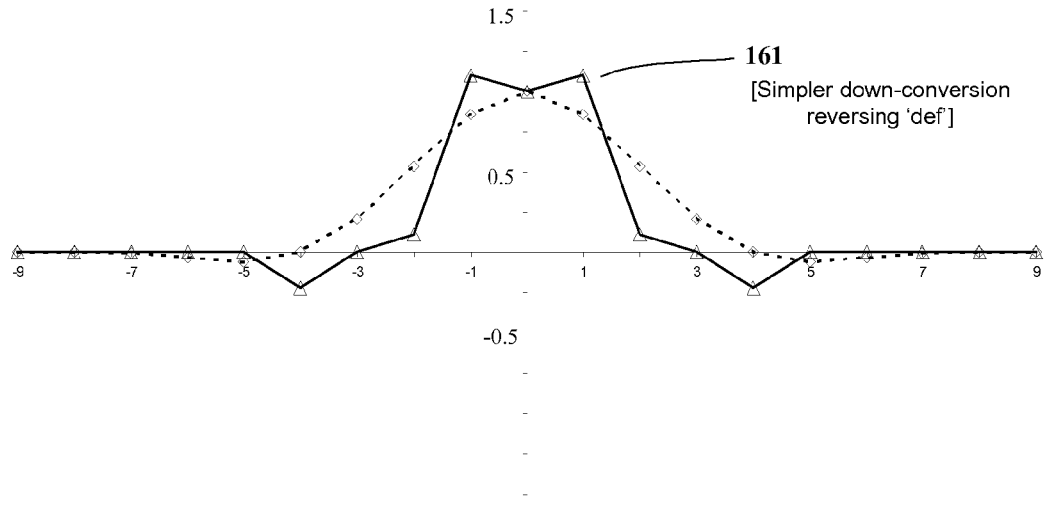
FIG. 16 shows the filter aperture functions of a transparent up- and down-conversion using an alternative up-conversion filter and an improved down-conversion filter.
Figure 17:
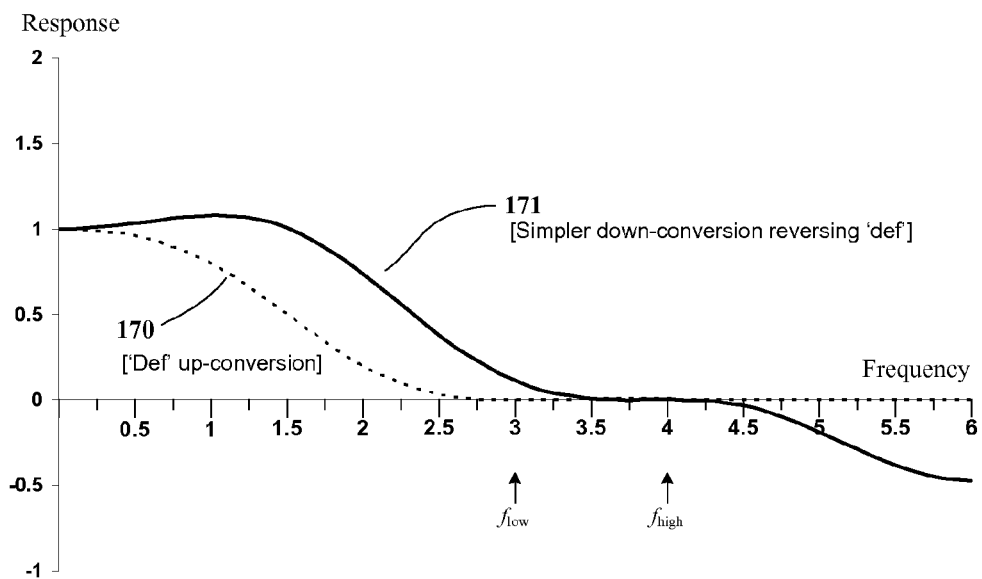
FIG. 17 shows the frequency responses of the FIG. 16 filter aperture functions.

Improved filters which reverse the Werner 'def' up-conversion filter (as shown at (60) in FIG. 6) are also possible. A simpler, symmetrical down-conversion filter aperture (161) is shown in FIG. 16, and its frequency response (171) is shown in FIG. 17. (The frequency response (170) of the 'def' up-conversion filter is also shown.) The improved aperture requires the storage of seven non-unity coefficient values, whereas the FIG. 6 filter needs 11 non-unity values to be stored. Comparison of FIGS. 10 and 17 shows that the improved filter has flatter pass- and stop-bands.

Figure 18:
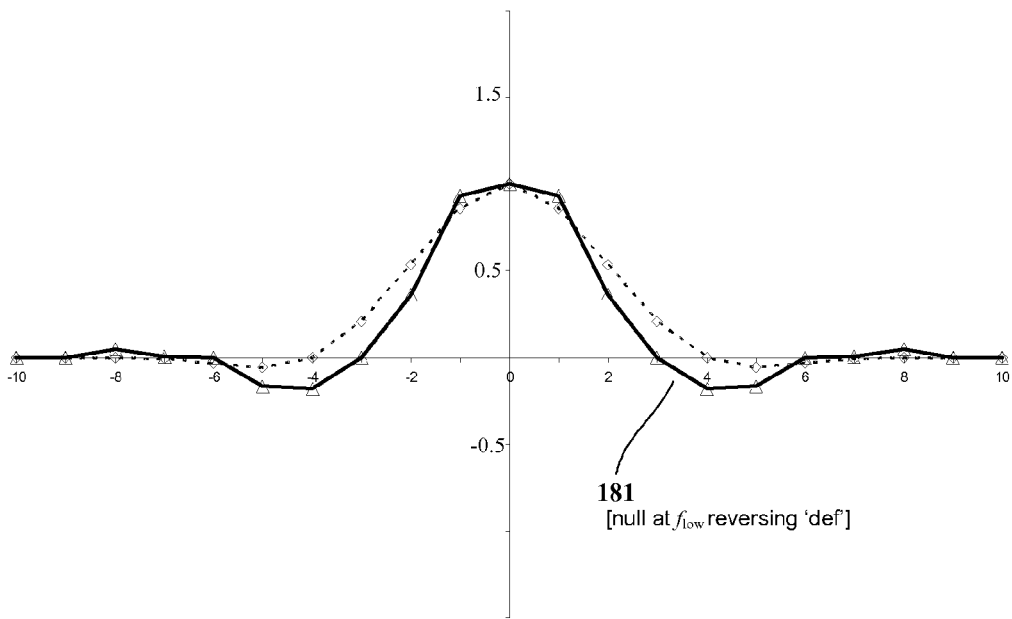
FIG. 18 shows the filter aperture functions of a transparent up- and down-conversion using an alternative up-conversion filter and an improved down-conversion filter having null response at three frequency units.
Figure 19:
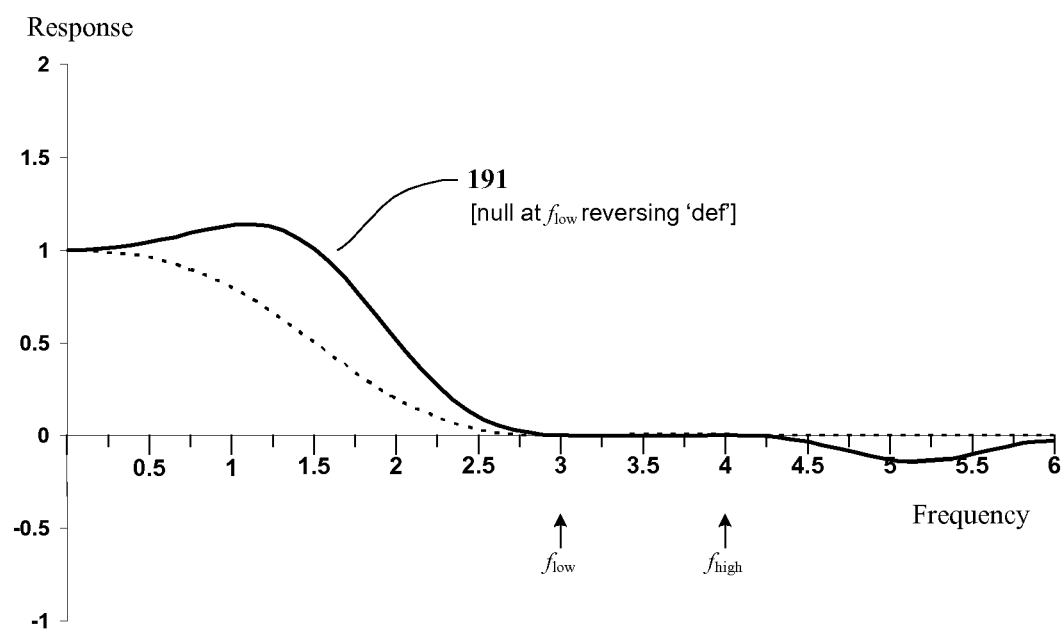
FIG. 19 shows the frequency responses of the FIG. 18 filter aperture functions.

Once again the improved down-conversion filter of FIG. 16 can be combined with the prior down-conversion filter of FIG. 6 by forming a weighted sum of the filter apertures, and choosing the weights to obtain a null in the frequency response at $f_{low}$. The resulting aperture (181) and frequency response (191) are shown in FIGS. 18 and 19 respectively.

Although these improvements are helpful, the up-conversion filters have narrower pass-bands than the down-conversion filters, and the stop-band response is still unsatisfactory.

The inventor has appreciated that there is no need for differences between the frequency responses of the up- and down-conversion filters. The frequency response of a down-converter must avoid, and an up-converter must remove, aliasing of lower-definition material. Both these requirement depend on the lower of the two sampling frequencies, and are met when the cut-off frequency of the respective filter approximates to the Nyquist limit for the lower resolution sampling process (i.e. half of $f_{low}$). The inventor has also appreciated that it is possible to optimise the frequency response of a single filter aperture to obtain reversibility. This single aperture is used to define the sample contribution values for both the up- and down-conversion filters.

The optimised frequency response is used to determine the filter aperture function (i.e. the filter impulse response); however, values of this function are only required at times which correspond to filter input and output samples. Thus the frequency response need only be defined at a number of points equal to the width of the aperture (in units of the oversampling pitch that includes all input and output sample positions); this number defines the size of Fourier transform that converts between the time-domain aperture function and the frequency response.

Figure 20C:
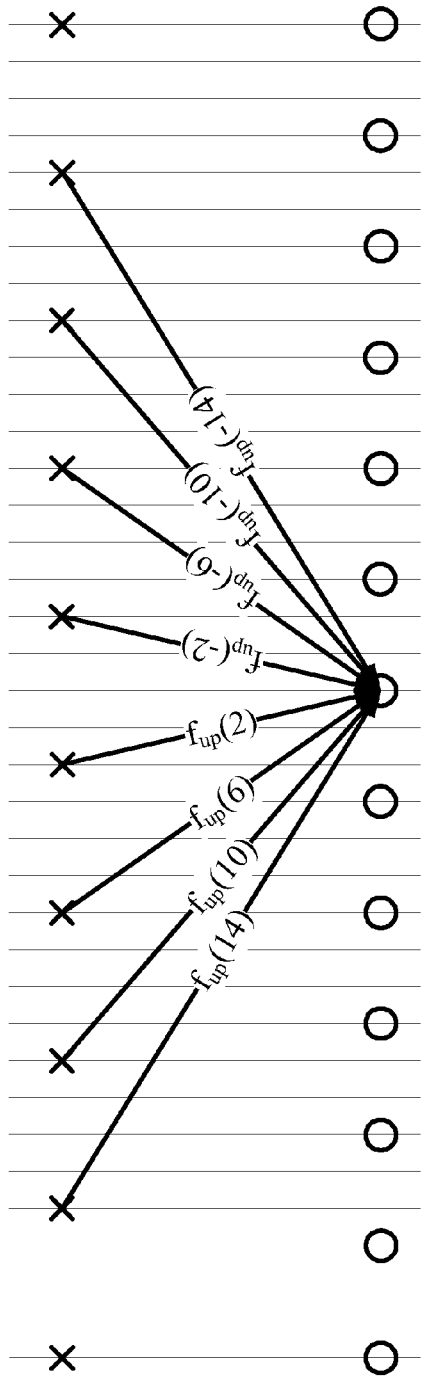
Figure 20D:
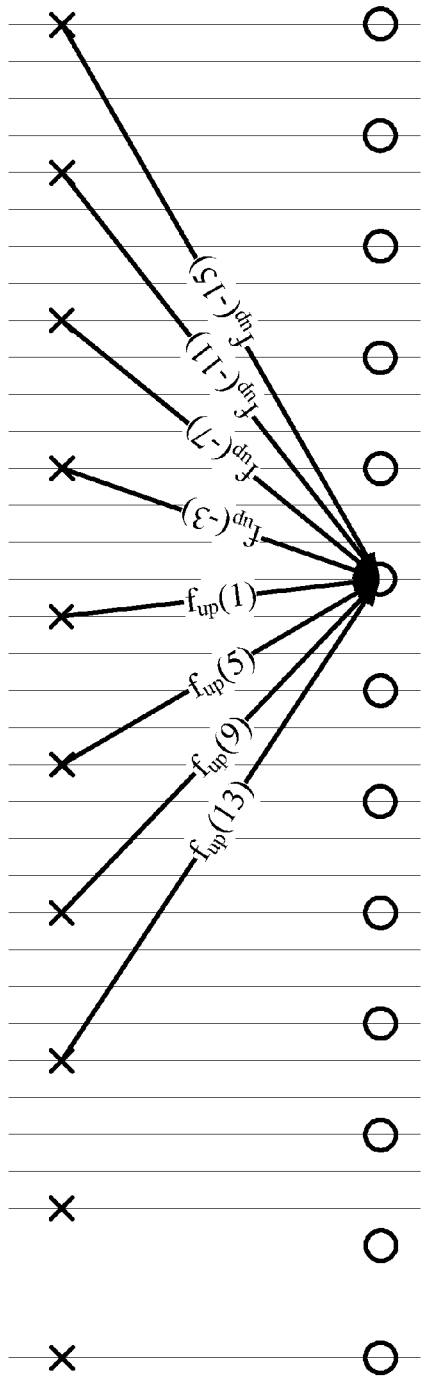
Figure 21A:
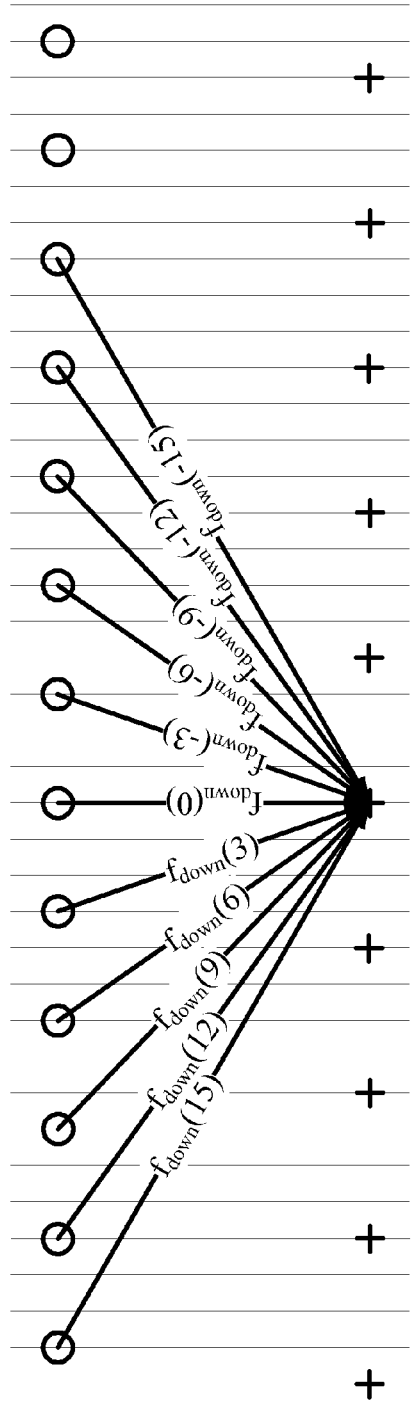
FIGS. 21a to 21c show representations of the phases of a down-conversion process according to an embodiment of the invention.

The width of the filter aperture obviously determines the number of contributions to the up- and down-filters. Because these two filters have different input sampling frequencies they will use different numbers of contributions even though they have the same aperture. FIGS. 20a to 20d show up-conversion filter contributions for an aperture width of ±16. The four figures show all the possible phases of the up-conversion filter ($f_{up}$). Similarly FIGS. 21a to 20c show the contributions to all possible phases of the down-conversion filter ($f_{down}$) having an aperture width of ±16.

It can be seen that there are more contributions to the down-conversion filter than to the up-conversion filter; this is because it has a higher input sampling frequency. And, the number of contributions to the up-conversion filter varies between 8 and 9, depending on the phase, whereas the down-conversion filter always has 11 contributions.

Figure 22A:
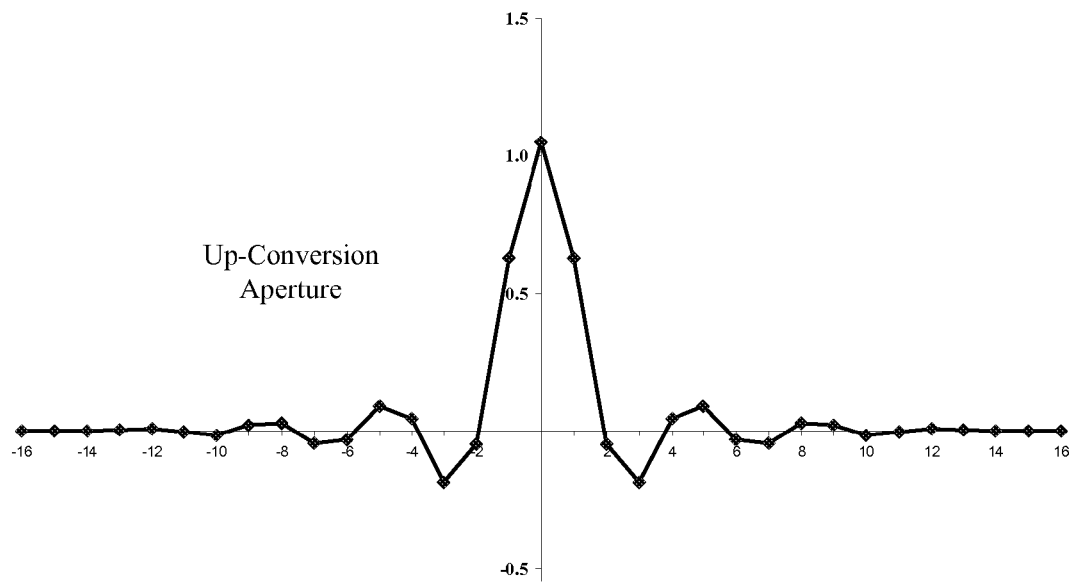
FIG. 22 shows exemplary up- and down-conversion filter apertures according to an embodiment the invention.
Figure 22B:
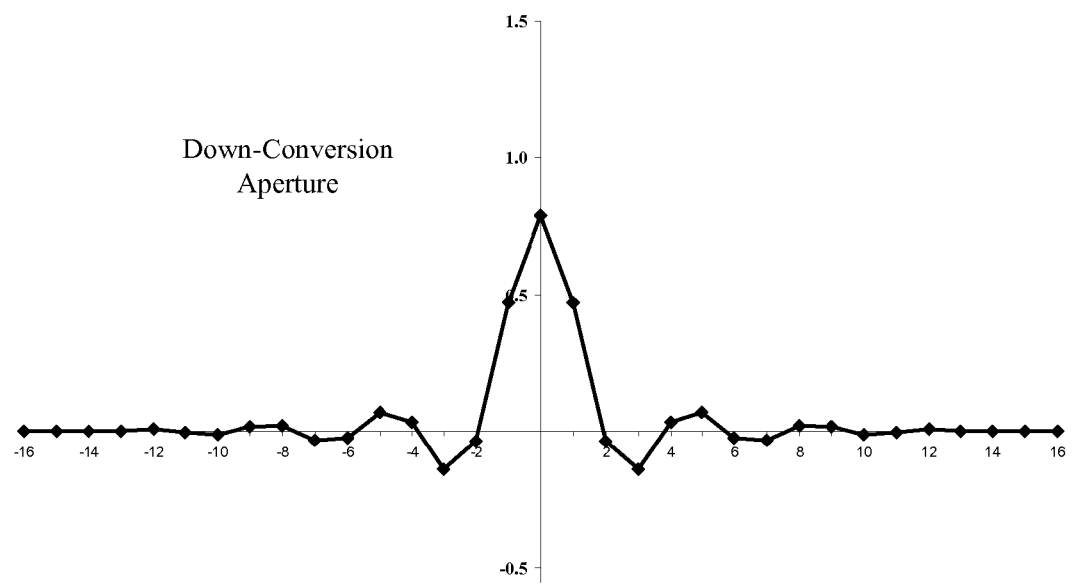

Suitable up- and down-filter aperture functions are shown in FIGS. 22a and 22b respectively; the values of the contributions are also shown in Tables 3 and 4 to six decimal places. These functions are defined for input to output phase differences in the range ±16. (Outside this range the impulse responses of the filters are zero.) Although two functions are illustrated, they differ only in their amplitude scaling, which differs in inverse proportion to the number of respective filter contributions, so as to obtain unity DC gain for both filters. Because they represent differently-scaled versions of the same function they are designated $f_{up}$ and $f_{down}$ respectively. Note that neither of the zero-phase contributions is unity, and every filtered sample is formed from a weighted sum of at least two filter-input samples.

Figure 23:
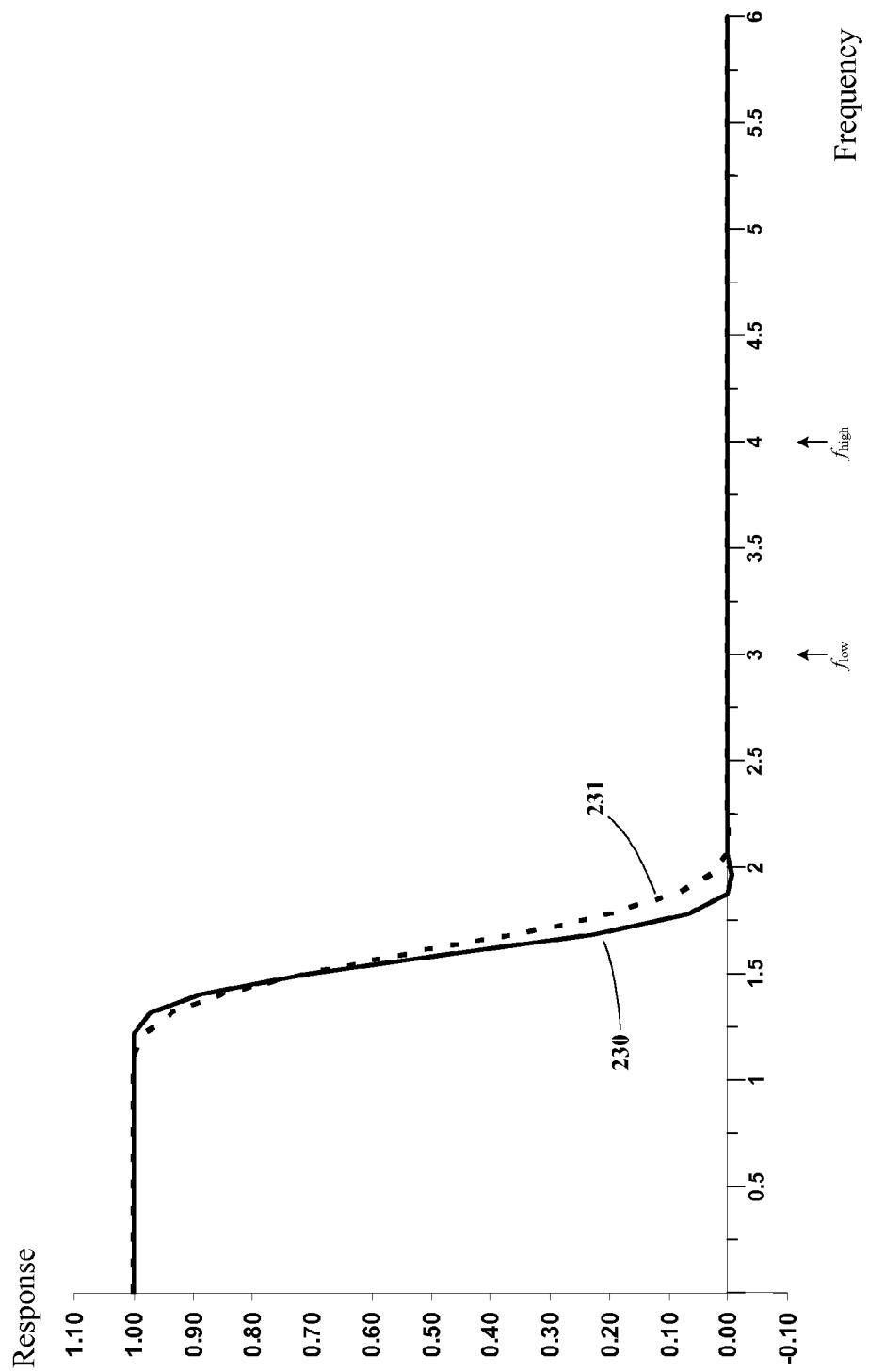
FIG. 23 shows the frequency responses of the FIG. 22 and FIG. 24 filter aperture functions.

The frequency response (identical, of course, for both the up- and down-conversion filters) of the apertures shown in FIG. 22 is shown as the curve (230) in FIG. 23.

The single aperture was created by optimising the reversibility of a candidate aperture by adjusting three (out of 32) frequency response parameters that control the shape the transition band of the filter frequency response. The parameters are amplitudes of the frequency response at particular frequencies; the parameters which were not optimised were set to either unity, for points in the pass-band (well below 1.5 frequency units), or zero, for points in the filter stop-band (well above 1.5 frequency units), respectively. As explained previously, the number of frequency parameters was chosen to equal the width of the filter aperture and the well-known Fourier transform was used to convert between the frequency response and the filter aperture. The 32 frequency response points from which the FIG. 22 aperture functions are derived are given in Table 1.

TABLE 1

3-Parameter-Optimised Frequency Response

| Point Number | Frequency | Response |
|---|---|---|
| 0 | 0.0000 | 1 |
| 1 | 0.1875 | 1 |
| 2 | 0.3750 | 1 |
| 3 | 0.5625 | 1 |
| 4 | 0.7500 | 1 |
| 5 | 0.9375 | 1 |
| 6 | 1.1250 | 1 |
| 7 | 1.3125 | 0.973439 |
| 8 | 1.5000 | 0.707653 |
| 9 | 1.6875 | 0.227062 |
| 10 | 1.8750 | 0 |
| 11 | 2.0625 | 0 |
| 12 | 2.2500 | 0 |
| 13 | 2.4375 | 0 |
| 14 | 2.6250 | 0 |
| 15 | 2.8125 | 0 |
| 16 | 3.0000 | 0 |
| 17 | 3.1875 | 0 |
| 18 | 3.3750 | 0 |
| 19 | 3.5625 | 0 |
| 20 | 3.7500 | 0 |
| 21 | 3.9375 | 0 |
| 22 | 4.1250 | 0 |
| 23 | 4.3125 | 0 |
| 24 | 4.5000 | 0 |
| 25 | 4.6875 | 0 |
| 26 | 4.8750 | 0 |
| 27 | 5.0625 | 0 |
| 28 | 5.2500 | 0 |
| 29 | 5.4375 | 0 |
| 30 | 5.6250 | 0 |
| 31 | 5.8125 | 0 |

Although the cascaded up- and down-sampling processes using these optimised, identical filters is very close to being reversible, some small reconstruction errors do result. But, the largest of these (as evaluated on a unit impulse) is less than one third of the amplitude of one least-significant-bit in a ten-bit system. Any practical filter will use quantised signals and thus such errors will usually be eliminated by rounding inherent in the digital processing.

It is possible to achieve even smaller reconstruction errors by allowing more points in the filter frequency response to be changed in the optimisation. An optimisation in which seven of the frequency response parameters were varied resulted in the alternative up- and down-filter apertures shown in FIG. 24 (and listed in Tables 3 and 4). As before, each is a differently-scaled version of the same function. The corresponding frequency response is shown at (231) in FIG. 23, and it can be seen that improved reversibility has been achieved at the price of a less-sharp response, which will allow more aliasing. Again, every filtered sample is formed from a weighted sum of at least two filter-input samples, and neither zero-phase contribution is equal to unity.

Figure 24A:
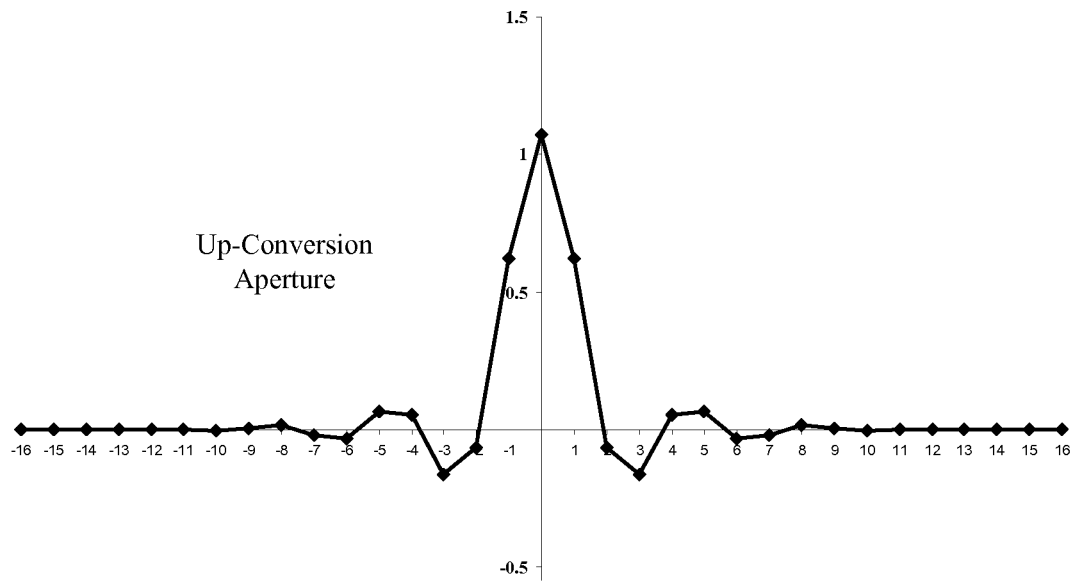
FIG. 24 shows exemplary up- and down-conversion filter apertures according to an alternative embodiment the invention.
Figure 24B:
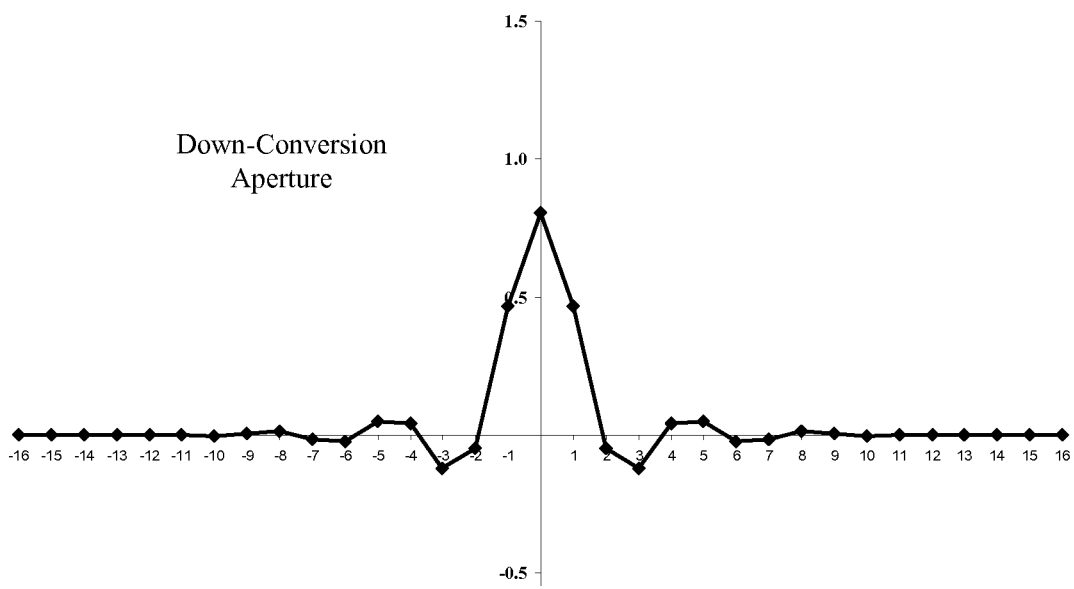

The frequency response parameters used to derive the FIG. 24 aperture functions are shown in Table 2.

TABLE 2

7-Parameter-Optimised Frequency Response

| Point Number | Frequency | Response |
|---|---|---|
| 0 | 0.0000 | 1 |
| 1 | 0.1875 | 1 |
| 2 | 0.3750 | 1 |
| 3 | 0.5625 | 1 |
| 4 | 0.7500 | 1 |
| 5 | 0.9375 | 0.999977 |
| 6 | 1.1250 | 0.996351 |
| 7 | 1.3125 | 0.936209 |
| 8 | 1.5000 | 0.707130 |
| 9 | 1.6875 | 0.351339 |
| 10 | 1.8750 | 0.085753 |
| 11 | 2.0625 | 0.003074 |
| 12 | 2.2500 | 0 |
| 13 | 2.4375 | 0 |
| 14 | 2.6250 | 0 |
| 15 | 2.8125 | 0 |
| 16 | 3.0000 | 0 |
| 17 | 3.1875 | 0 |
| 18 | 3.3750 | 0 |
| 19 | 3.5625 | 0 |
| 20 | 3.7500 | 0 |
| 21 | 3.9375 | 0 |
| 22 | 4.1250 | 0 |
| 23 | 4.3125 | 0 |
| 24 | 4.5000 | 0 |
| 25 | 4.6875 | 0 |
| 26 | 4.8750 | 0 |
| 27 | 5.0625 | 0 |
| 28 | 5.2500 | 0 |
| 29 | 5.4375 | 0 |
| 30 | 5.6250 | 0 |
| 31 | 5.8125 | 0 |

The reconstruction errors due to the FIG. 24 apertures (evaluated on unit impulses as before) are very much smaller than for the FIG. 22 apertures, and amount to less than one tenth of the LSB of a ten-bit system.

For a given aperture width there is therefore a trade-off between sharpness of cut and reversibility (i.e. absence of reconstruction errors). However, if larger reconstruction errors are acceptable, perhaps because fewer bits are used to represent the signal and therefore larger errors will be eliminated by rounding, then a narrower filter aperture can be used.

The filters described so far have phase coincidence between suitable sub-sets of the input and output sampling structures. But it is also possible to derive oversampled filter apertures which can be used to define the contributions of filters having phase-shifted output samples on a corresponding oversampled structure. This is simply achieved by increasing the number of stop-band points at which the frequency response is defined (i.e. defining the response up to a higher oversampling frequency, greater than the 12 frequency units in the example shown) and thus obtaining more impulse response values from the inverse Fourier transform.

The invention has been described in the context of 3:4 up-conversion followed by 4:3 down-conversion. It is equally applicable when the down-conversion precedes the up-conversion. The skilled person will be able to apply the invention to other conversion ratios by: determining a candidate frequency response having a transition band in the region of half the lower sampling frequency, defined at a convenient number of frequencies equal to a practical aperture width; and, optimising the frequency response by adjusting some of the defined response values so as to minimise the reconstruction errors obtained in a test (either simulated or practical) of cascaded conversions of filters defined by the aperture function represented by an inverse Fourier transform of the frequency response.

The apertures shown in FIGS. 22 and 24 were optimised to minimise the reconstruction errors due to impulse inputs. This filter selection criterion may be unrealistically stringent if it is known that the spectrum of the input signal to the cascaded conversion processes has previously been limited. It may be preferable to optimise the frequency response parameters that define the up- and down-conversion filter apertures using reconstruction errors due to signals representative of those that will typically be processed.

Although it is normally desirable for the responses of the up- and down-conversion filters to be similar, this may not always be the case. If so, it is possible to optimise the reconstruction errors due the cascade of a pair of filters which are different from each other in some desired way.

Filters according to the principles which have been described may be incorporated into multi-standard video processing equipment—such as vision mixers or "production switchers" as they are known in some territories. Such an equipment may allow the user to input material at different sampling resolutions and to choose between different output sampling resolutions, or provide simultaneous outputs of the same material at different sampling resolutions. The processing can be carried out at the highest expected sampling resolution and lower resolution inputs up-converted to that resolution, and lower resolution outputs down-converted from that resolution. Inputs of different resolution can thus be combined in a process operating at the higher resolution and output with or without down-conversion.

TABLE 3

Up-Conversion Filters

| | g(x) | | $f_{up}(x)$ | |
|---|---|---|---|---|
| x | FIGS. 1 2 3 4 7 8 11 12 13 14 15 | FIGS. 5 6 9 10 16 17 18 19 | FIGS. 20 22 23 | FIGS. 20 22 23 24 |
| −16 | | | 0.000448 | −0.000084 |
| −15 | | | 0.000028 | −0.000092 |

TABLE 3-continued

Up-Conversion Filters

| | g(x) | | $f_{up}(x)$ | |
|---|---|---|---|---|
| x | FIGS. 1 2 3 4 7 8 11 12 13 14 15 | FIGS. 5 6 9 10 16 17 18 19 | FIGS. 20 22 23 | FIGS. 20 22 23 24 |
| −14 | | | −0.002800 | 0.000204 |
| −13 | | | 0.001344 | 0.000076 |
| −12 | | | 0.008236 | 0.000744 |
| −11 | | | −0.007048 | −0.000508 |
| −10 | | | −0.016364 | −0.005232 |
| −9 | | | 0.020200 | 0.004996 |
| −8 | | | 0.025956 | 0.015628 |
| −7 | | −0.004832 | −0.045064 | −0.021308 |
| −6 | | −0.030332 | −0.035548 | −0.032036 |
| −5 | | −0.054860 | 0.090568 | 0.063384 |
| −4 | | 0 | 0.043680 | 0.051036 |
| −3 | 1/4 | 0.204804 | −0.188420 | −0.166500 |
| −2 | 1/2 | 0.530332 | −0.049112 | −0.066500 |
| −1 | 3/4 | 0.854892 | 0.628388 | 0.619960 |
| 0 | 1 | 1 | 1.051020 | 1.072480 |
| 1 | 3/4 | 0.854892 | 0.628388 | 0.619960 |
| 2 | 1/2 | 0.530332 | −0.049112 | −0.066500 |
| 3 | 1/4 | 0.204804 | −0.188420 | −0.166500 |
| 4 | | 0 | 0.043680 | 0.051036 |
| 5 | | −0.054860 | 0.090568 | 0.063384 |
| 6 | | −0.030332 | −0.035548 | −0.032036 |
| 7 | | −0.004832 | −0.045064 | −0.021308 |
| 8 | | | 0.025956 | 0.015628 |
| 9 | | | 0.020200 | 0.004996 |
| 10 | | | −0.016364 | −0.005232 |
| 11 | | | −0.007048 | −0.000508 |
| 12 | | | 0.008236 | 0.000744 |
| 13 | | | 0.001344 | 0.000076 |
| 14 | | | −0.002800 | 0.000204 |
| 15 | | | 0.000028 | −0.000092 |
| 16 | | | 0.000448 | −0.000084 |

TABLE 4

Down-Conversion Filters

Figure 1:
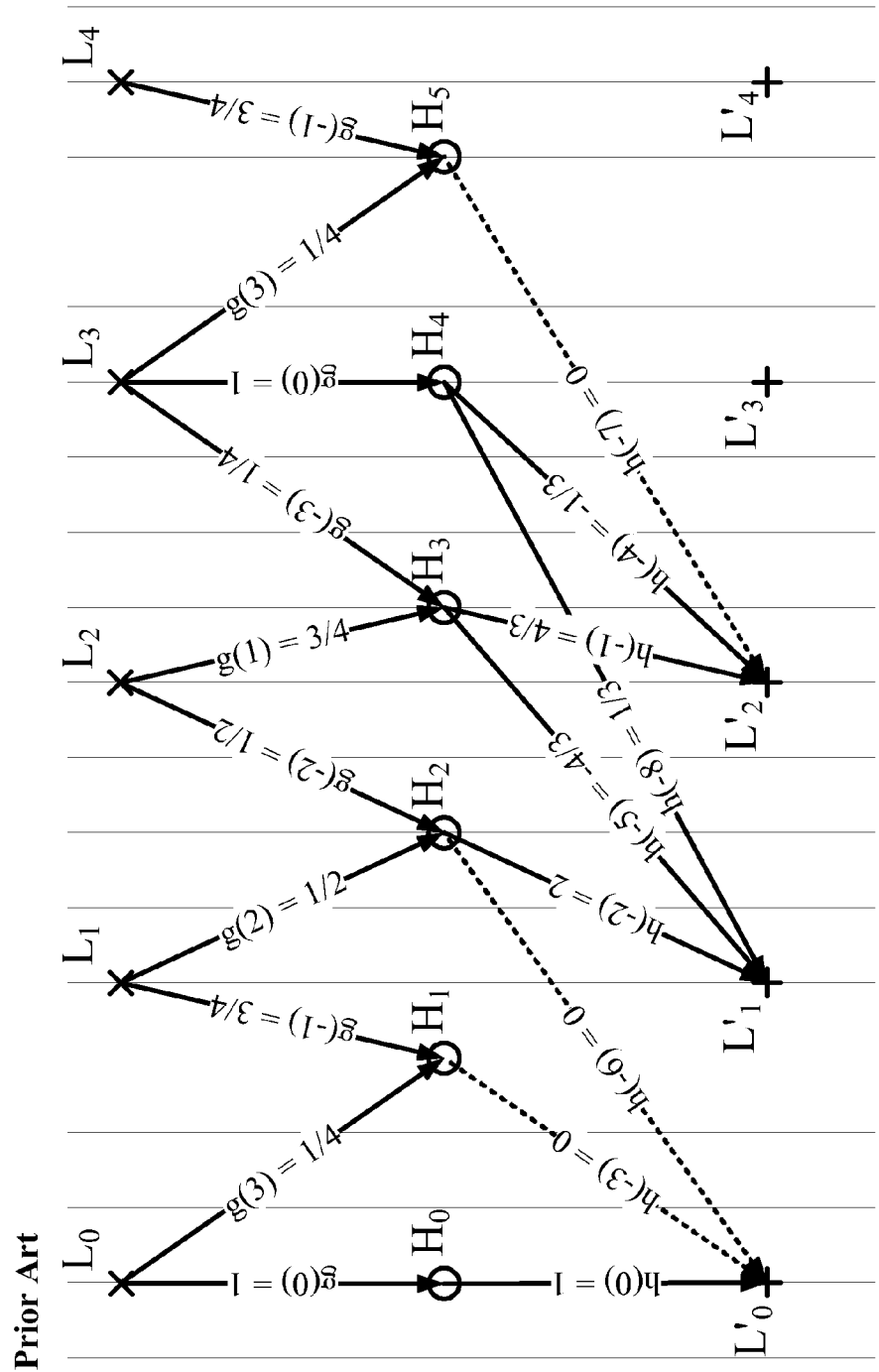
FIG. 1 shows a representation of a prior art transparent up- and down-conversion process using an asymmetric down-conversion filter.
Figure 2:
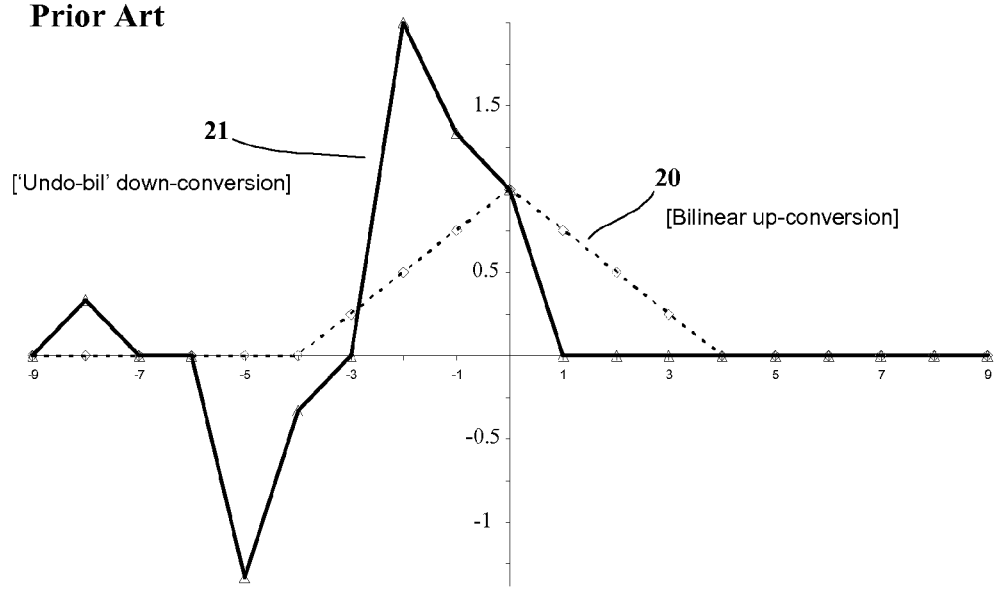
FIG. 2 shows the filter aperture functions of the prior art process of FIG. 1.
Figure 3:
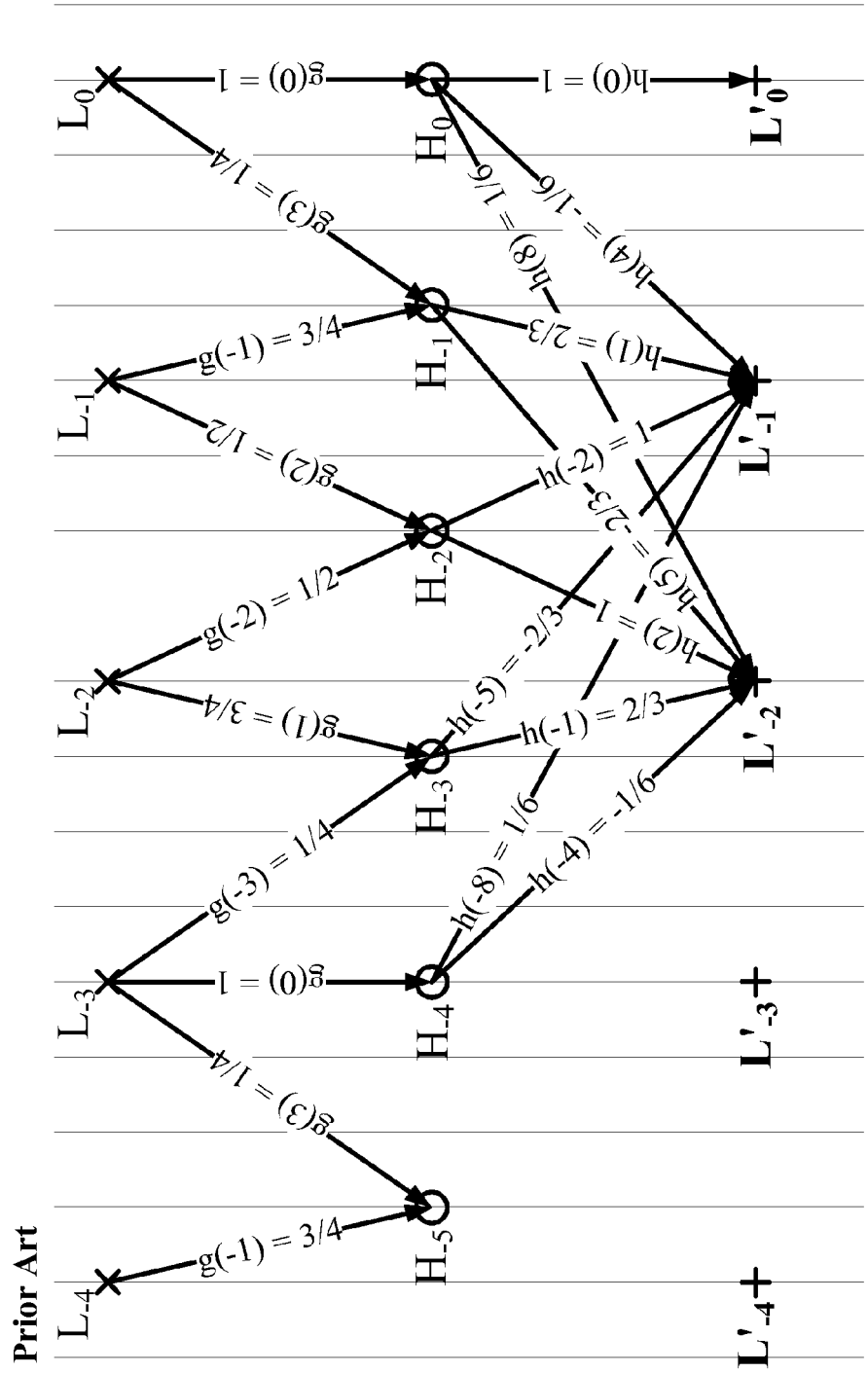
FIG. 3 shows a representation of a prior art transparent up- and down-conversion process using a symmetrical down-conversion filter.
Figure 5:
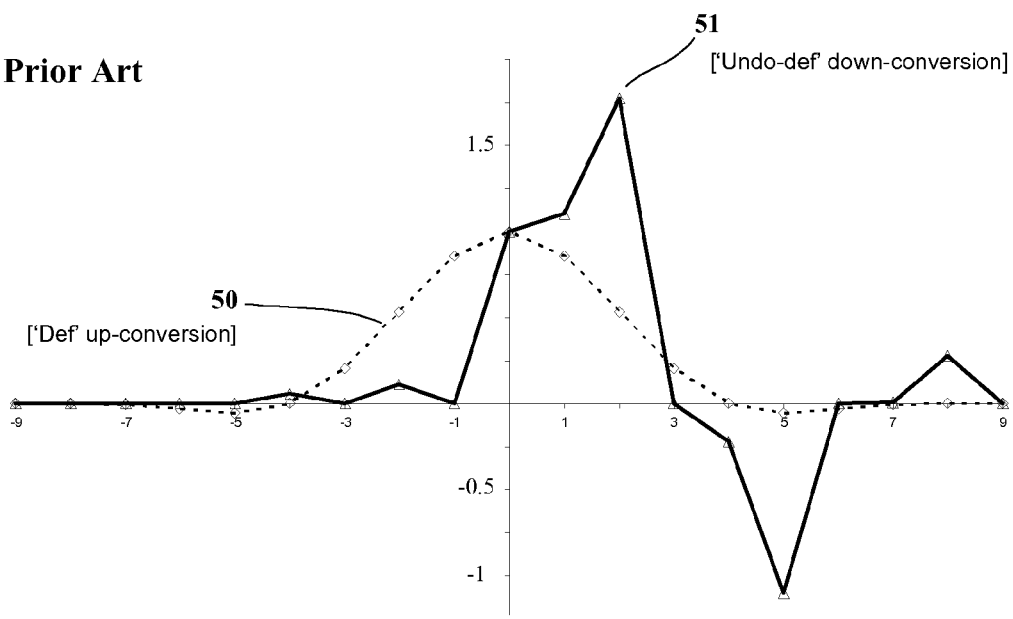
FIG. 5 shows the filter aperture functions of an alternative prior-art transparent up- and down-conversion using an asymmetric down-conversion filter.
Figure 7:
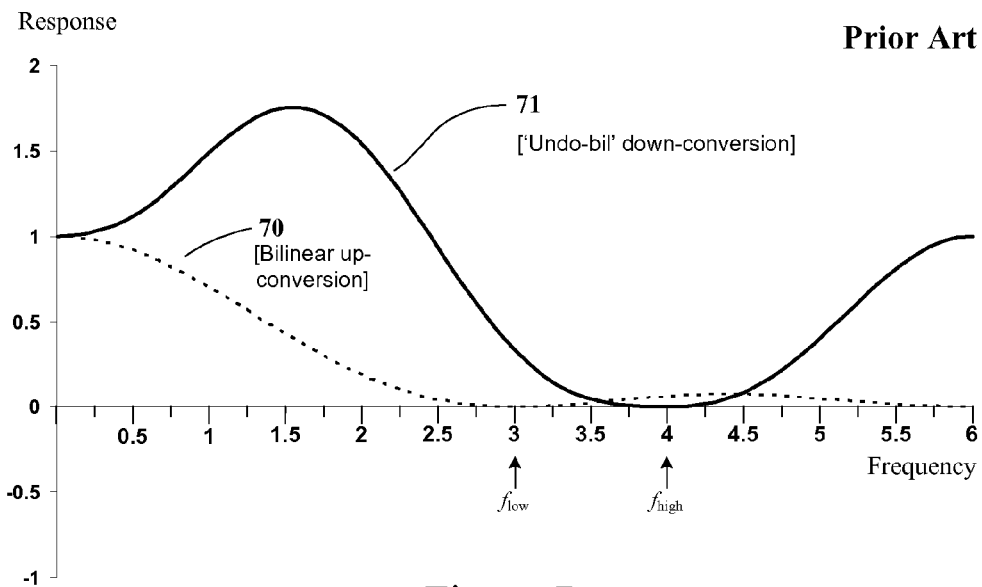
FIG. 7 shows the frequency responses of the FIG. 2 filter aperture functions.
Figure 8:
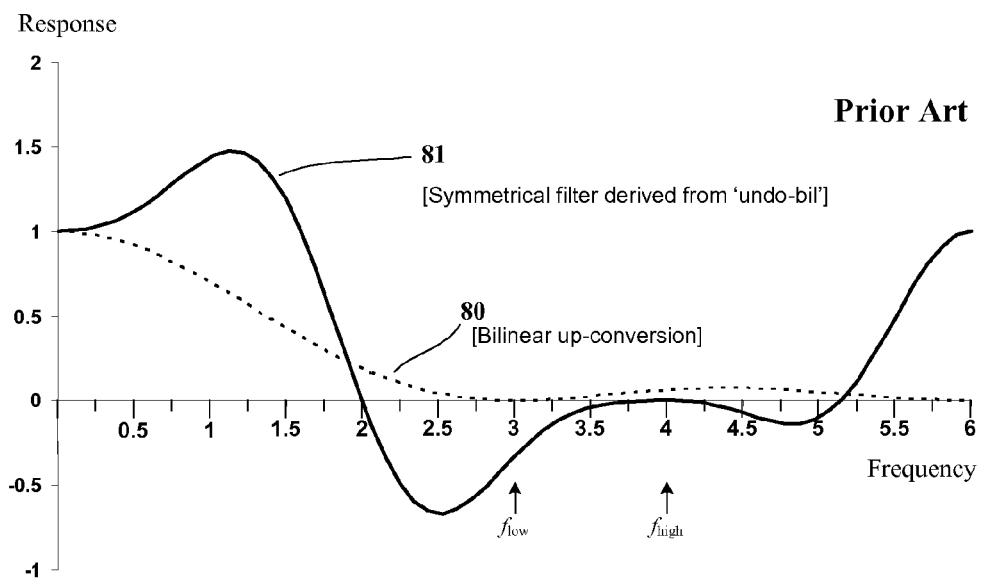
FIG. 8 shows the frequency responses of the FIG. 4 filter aperture functions.
Figure 9:
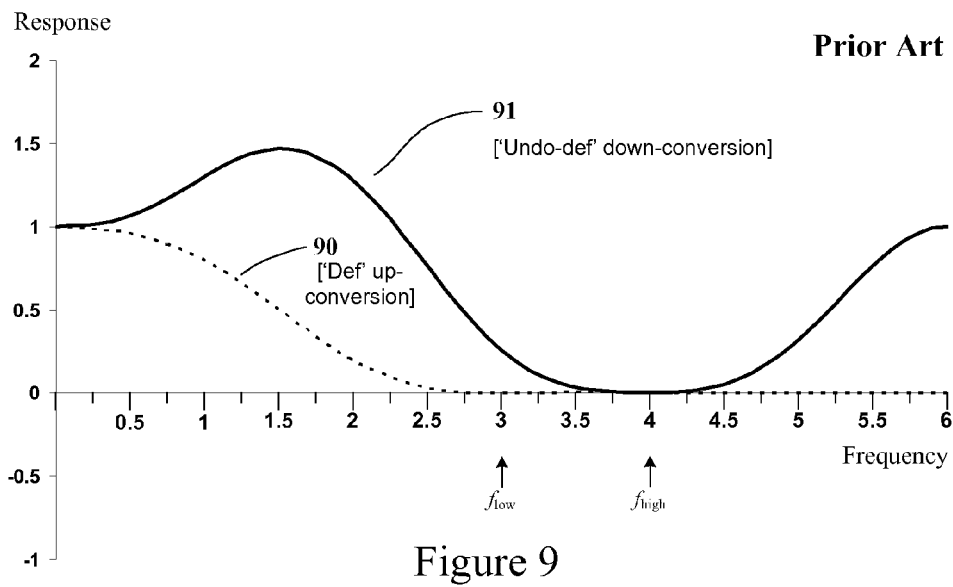
FIG. 9 shows the frequency responses of the FIG. 5 filter aperture functions.
Figure 21B:
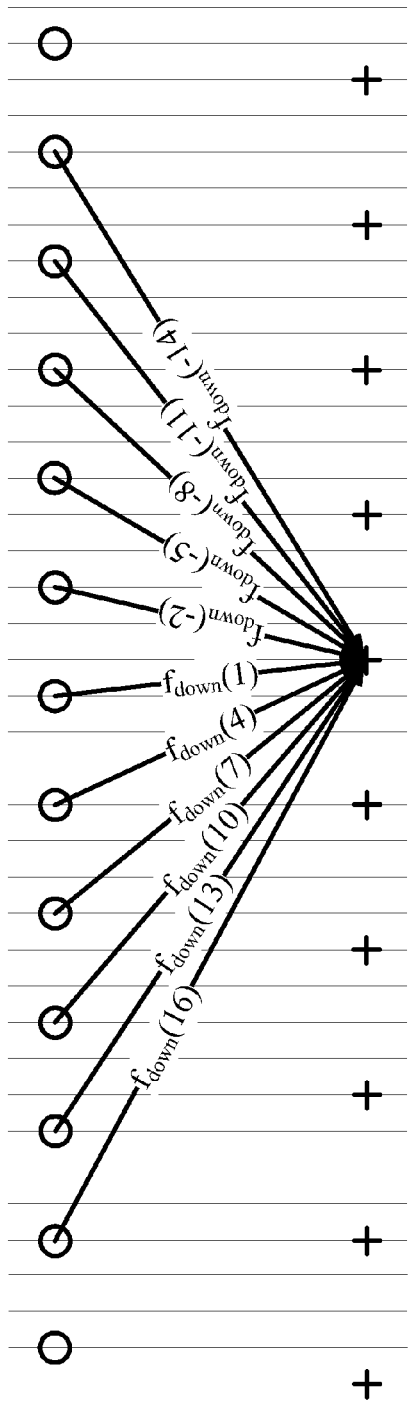
Figure 21C:
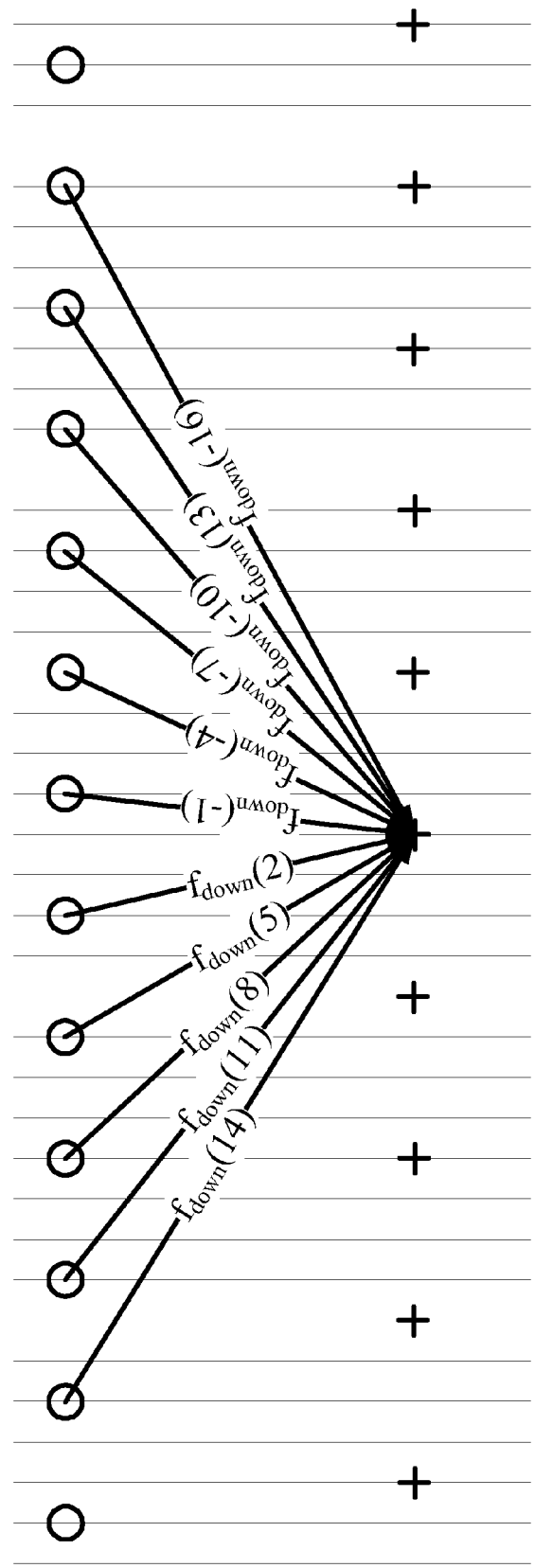

| | h(x) | | | | | | | | $f_{down}(x)$ | |
|---|---|---|---|---|---|---|---|---|---|---|
| x | FIGS. 1 2 7 | FIGS. 3 4 8 | FIGS. 5 9 | FIGS. 6 10 | FIGS. 11 12 13 | FIGS. 14 15 | FIGS. 16 17 | FIGS. 18 19 | FIGS. 21 22 23 | FIGS. 21 23 24 |
| −20 | | | | −0.000009 | | | | −0.000003 | | |
| −19 | | | | 0 | | | | 0 | | |
| −18 | | | | 0 | | | | 0 | | |
| −17 | | | | 0 | | | | 0 | | |
| −16 | | | | 0.000090 | | | 0.000018 | 0.000016 | 0.000336 | 0.000063 |
| −15 | | | | 0 | | | 0 | 0 | 0.000021 | −0.000069 |
| −14 | | | | −0.000302 | | | 0 | −0.000091 | −0.002100 | 0.000153 |
| −13 | | | | 0 | | | 0 | 0 | 0.001008 | 0.000057 |
| −12 | | | | 0 | | | 0 | 0 | 0.006177 | 0.000558 |
| −11 | | | | −0.002919 | | | 0 | −0.000880 | −0.005286 | −0.000381 |
| −10 | | | | 0.000302 | | | 0.000604 | 0.000513 | −0.012273 | −0.003924 |
| −9 | | | | 0 | | | 0 | 0 | 0.015150 | 0.003747 |
| −8 | 1/3 | 1/6 | 0.003449 | 0.141700 | | 0.041670 | 0.003449 | 0.045120 | 0.019467 | 0.011721 |
| −7 | 0 | 0 | 0 | 0.002919 | 0 | −0.222900 | 0.004959 | −0.033798 | −0.015981 | |
| −6 | 0 | 0 | 0 | 0 | 0 | 0 | 0 | −0.026661 | −0.024027 | |
| −5 | −4/3 | −2/3 | 0 | −0.549600 | | −0.166700 | 0 | −0.165600 | 0.067926 | 0.047538 |
| −4 | −1/3 | −1/6 | 0.053745 | −0.084550 | −1/3 | −0.291700 | −0.222900 | −0.181200 | 0.032760 | 0.038277 |
| −3 | 0 | 0 | 0 | 0 | 0 | 0 | 0 | 0 | −0.141315 | −0.124875 |
| −2 | 2 | 1 | 0.113710 | 0.942800 | 0 | 0.250000 | 0.113700 | 0.363500 | −0.036834 | −0.049875 |
| −1 | 4/3 | 2/3 | 0 | 0.549600 | 4/3 | 1.166667 | 1.099000 | 0.933600 | 0.471291 | 0.464970 |
| 0 | 1 | 1 | 1 | 1 | 1 | 1 | 1 | 1 | 0.788265 | 0.804360 |

TABLE 4-continued

Down-Conversion Filters

| | h(x) | | | | | | | | $f_{down}(x)$ | |
|---|---|---|---|---|---|---|---|---|---|---|
| x | FIGS. 1 2 7 | FIGS. 3 4 8 | FIGS. 5 9 | FIGS. 6 10 | FIGS. 11 12 13 | FIGS. 14 15 | FIGS. 16 17 | FIGS. 18 19 | FIGS. 21 22 23 | FIGS. 21 23 24 |
| 1 | | 2/3 | 1.099232 | 0.549600 | 4/3 | 1.166667 | 1.099000 | 0.933600 | 0.471291 | 0.464970 |
| 2 | | 1 | 1.771901 | 0.942800 | 0 | 0.250000 | 0.113700 | 0.363500 | −0.036834 | −0.049875 |
| 3 | | 0 | 0 | 0 | 0 | 0 | 0 | 0 | −0.141315 | −0.124875 |
| 4 | | −1/6 | −0.222855 | −0.084550 | −1/3 | −0.291700 | −0.222900 | −0.181200 | 0.032760 | 0.038277 |
| 5 | | −2/3 | −1.099232 | −0.549600 | | −0.166700 | 0 | −0.165600 | 0.067926 | 0.047538 |
| 6 | | 0 | 0 | 0 | | 0 | 0 | 0 | −0.026661 | −0.024027 |
| 7 | | 0 | 0.005838 | 0.002919 | | 0 | −0.222900 | 0.004959 | −0.033798 | −0.015981 |
| 8 | | 1/6 | 0.280050 | 0.141700 | | 0.041670 | 0.003449 | 0.045120 | 0.019467 | 0.011721 |
| 9 | | | 0 | 0 | | | 0 | 0 | 0.015150 | 0.003747 |
| 10 | | | 0.000604 | 0.000302 | | | 0.000604 | 0.000513 | −0.012273 | −0.003924 |
| 11 | | | −0.005838 | −0.002919 | | | 0 | −0.000880 | −0.005286 | −0.000381 |
| 12 | | | 0 | 0 | | | 0 | 0 | 0.006177 | 0.000558 |
| 13 | | | 0 | 0 | | | 0 | 0 | 0.001008 | 0.000057 |
| 14 | | | −0.000604 | −0.000302 | | | 0 | −0.000091 | −0.002100 | 0.000153 |
| 15 | | | 0 | 0 | | | 0 | 0 | 0.000021 | −0.000069 |
| 16 | | | 0.000018 | 0.000090 | | | 0.000018 | 0.000016 | 0.000336 | −0.000063 |
| 17 | | | 0 | 0 | | | 0 | | | |
| 18 | | | 0 | 0 | | | 0 | | | |
| 19 | | | 0 | 0 | | | 0 | | | |
| 20 | | | −0.000018 | −0.000009 | | | −0.000003 | | | |

The invention claimed is:

1. Digital image processing apparatus in which first image data representing a digital image at a lower sampling frequency is up-sampled in a sampling ratio N:M to a higher sampling frequency in an up-sampling filter to produce second image data representing the said digital image at the said higher sampling frequency; and, said second image data at the said higher sampling frequency is down-sampled in a sampling ratio M:N to the said lower sampling frequency in a down-sampling filter to produce third image data representing said digital image at said lower sampling frequency, where the combination of the up-sampling filter and the down-sampling filter is substantially transparent characterised in that every filtered sample is formed from a weighted sum of at least two input samples, where N and M are integers, where 1<N<M and where M is not a multiple of N.

2. Apparatus according to claim 1, in which the combination of the up-sampling filter and the down-sampling filter is substantially transparent in the sense that the reconstruction error due to the combination of the up-sampling filter and the down-sampling filter is smaller than one least-significant bit of the said digital image processing.

3. A method of digital image processing in one or more digital image processors for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k).g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k).h(Mn-Nk)$; the pair (g, h) of up and down conversion filters being chosen so that $\Sigma h(Mn-Nk).g(Nk-Mm)$ is equal to unity if n=m and is otherwise equal to zero, and wherein every filtered sample is formed from a weighted sum of at least two input samples.

4. A method according to claim 3 in which at least part the said first and second image data represent the same portrayed object.

5. A method according to claim 3 in which the amplitude of the response of the said up-conversion filter and the amplitude of the response of the said down-conversion filter have substantially equal magnitudes at a frequency of half the said lower sampling frequency.

6. A method according to claim 3 in which the frequency response of the said up-conversion filter and the frequency response said down-conversion filter are substantially identical.

7. A method according to claim 3 in which an up- or down-sampling filter has no phase coincidence between its input and output samples.

8. A method of digital image processing in one or more digital image processors for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k).g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k).h(Mn-Nk)$; the pair (g, h) of up and down conversion filters being chosen so that $\Sigma h(Mn-Nk).g(Nk-Mm)$ is equal to unity if n=m and is otherwise equal to zero, and wherein the frequency response of the up conversion filter is substantially the same as the frequency response of the down conversion filter.

9. A method of digital image processing in one or more digital image processors for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k).g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k).h(Mn-Nk)$; the pair (g, h) of up and down conversion filters being chosen so that $\Sigma h(Mn-Nk).g(Nk-Mm)$ is equal to unity if n=m and is otherwise equal to zero, and wherein the frequency response of the down converter at the sampling frequency of the sampled signal $S_{input}$ is less than 10%.

10. A method according to claim 9, wherein the frequency response of the down converter at the sampling frequency of the sampled signal $S_{input}$ is less than 5% of the frequency response at DC.

11. A method according to claim 9, wherein the frequency response of the down converter at the sampling frequency of the sampled signal $S_{input}$ is less than 1% of the frequency response at DC.

12. A digital image processing system in which first image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter, where N and M are integers, where 1<N<M and where M is not a multiple of N, wherein a frequency response is optimised to minimise the reconstruction error due to the combination of the up-sampling filter and the down-sampling filter and wherein the filter aperture of the up-sampling filter and the filter aperture of the down-sampling filter are each constructed from said optimised frequency response.

13. A system according to claim 12, wherein in said optimised frequency response the response at the lower sampling frequency is less than 10%, preferably less than 5% and more preferably less than 1% of the frequency response at DC.

14. A system according to claim 12, wherein the reconstruction error is minimised in the sense of being smaller than one least-significant bit of the said digital image processing.

15. A method of digital image processing in one or more digital image processors in which first image data at a lower sampling frequency is up-sampled in a sampling ratio N:M to a higher sampling frequency in an up-sampling filter; and, second image data at the said higher sampling frequency is down-sampled in a sampling ratio M:N to the said lower sampling frequency in a down-sampling filter where the combination of the up-sampling filter and the down-sampling filter is substantially transparent characterised, where N and M are integers, where 1<N<M and where M is not a multiple of N and wherein the frequency response of the down converter at the lower sampling frequency is less than 10%.

16. A method according to claim 15, wherein the frequency response of the down converter at the lower sampling frequency is less than 5% of the frequency response at DC.

17. A method according to claim 15, wherein the frequency response of the down converter at the lower sampling frequency is less than 1% of the frequency response at DC.

18. A non-transitory computer program product contained instructions adapted to cause programmable apparatus to implement a method of digital image processing for achieving a transparent cascade on up conversion in the sampling rate ratio N:M where N and M are integers and subsequent M:N down conversion, where the up and down conversion ratios N:M and M:N respectively are rational numbers and the integers N and M satisfy the condition 1<N<M, wherein the up conversion filter operates on a sampled signal $S_{input}$ and is chosen to take the form $S_{up}(n)=\Sigma S_{input}(k).g(Nn-Mk)$ where k is the running integer over which the sum is taken and wherein a corresponding down conversion filter operates on the up converted signal $S_{up}$ and is chosen to take the form $S_{down}(n)=\Sigma S_{up}(k).h(Mn-Nk)$; the pair (g, h) of up and down conversion filters being chosen so that $\Sigma h(Mn-Nk).g(Nk-Mm)$ is equal to unity if n=m and is otherwise equal to zero, and wherein every filtered sample is formed from a weighted sum of at least two input samples.

* * * * *

UNITED STATES PATENT AND TRADEMARK OFFICE
CERTIFICATE OF CORRECTION

PATENT NO.        : 8,477,242 B2                                                                 Page 1 of 1
APPLICATION NO. : 12/992192
DATED             : July 2, 2013
INVENTOR(S)       : Martin Weston It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 216 days.

Signed and Sealed this
Eighth Day of September, 2015

Michelle K. Lee
*Director of the United States Patent and Trademark Office*